(12) United States Patent
Huggins

(10) Patent No.: US 6,264,230 B1
(45) Date of Patent: Jul. 24, 2001

(54) FOLDABLE HAND CART

(76) Inventor: Melvin E. Huggins, 10 Lyman Ave., Rutland, VT (US) 05701

(*) Notice: Subject to any disclaimer, the term of this patent is extended or adjusted under 35 U.S.C. 154(b) by 0 days.

(21) Appl. No.: 09/316,431

(22) Filed: May 21, 1999

(51) Int. Cl.$^7$ ................................ B62B 1/12; B62B 3/02
(52) U.S. Cl. ........................ 280/651; 280/641; 280/654; 301/52
(58) Field of Search ............................ 280/47.18, 47.19, 280/47.24, 47.26, 47.27, 47.28, 47.29, 641, 651, 652, 654; 301/7, 43, 52; 248/98, 99; 384/564

(56) References Cited

U.S. PATENT DOCUMENTS

| | | | | |
|---|---|---|---|---|
| 2,839,310 | * | 6/1958 | Livingston et al. | 280/645 |
| 3,008,463 | * | 11/1961 | Frank | 280/645 |
| 3,435,873 | * | 4/1969 | Weier | 301/7 |
| 5,388,854 | * | 2/1995 | Kappaz | 280/652 |
| 5,551,716 | * | 9/1996 | Kordecki et al. | 280/47.18 |
| 5,967,544 | * | 10/1999 | Kanta | 280/652 |

* cited by examiner

Primary Examiner—Michael Mar
Assistant Examiner—Hau Phan
(74) Attorney, Agent, or Firm—Kevin Ellicott, Esq.

(57) ABSTRACT

A beach cart having a first frame member and a second frame member, the first frame member being pivotably attached to the second frame member; a first payload carrier rotatably attached to the first frame member and removably attached to the second frame member; a second payload carrier pivotably attached to the first frame member and removably attached to the second frame member; a third payload carrier pivotably attached to the second frame member; a first wheel riser and a second wheel riser attached to the first frame member; a first wheel mounting block and a second wheel mounting block removably attached to the first wheel riser and the second wheel riser, respectively; a wear bearing and a second wear bearing mounted in the first wheel mounting block and the second wheel mounting block, respectively; and a roller assembly having a first end cap having a first stub axle and a second end cap having a second stub axle, the first stub axle being mounted within the first wear bearing and the first wheel mounting block, the second stub axle being mounted within the second wear bearing and the wheel mounting block, the roller assembly further having a cylindrical roller section spanning between the first end cap and the second end cap, the cylindrical roller section having a plurality of wave for vanes radially disposed about it.

17 Claims, 19 Drawing Sheets

FOLDABLE HAND CART

CROSS REFERENCE TO OTHER APPLICATIONS

This is the first submission of an application for this article of manufacture. There are no other applications, provisional or non provisional.

FEDERALLY SPONSORED RESEARCH AND DEVELOPMENT

There are no federally sponsored or funded research or development projects or undertakings in any way associated with the instant invention.

BACKGROUND OF THE INVENTION

1. Field of the Invention

The instant invention relates to that field of devices consisting of articles of manufacture known as hand carts. Specifically, the instant invention is a foldable cart having a specialized wheel and wheel bearings for traversing colloidal and soft soil environments such as sand, snow and the like.

2. Background Information

The prior art known to applicant discloses that hand carts are well known. Prior art hand carts have been specifically configured for use in sandy and other soft soil environments. These carts (usually referred to as beach carts) have included features which allow them to serve as seats in addition to being useful for transporting the various accessories that are often carried along to the beach, such as towels, coolers and such. An example of such a cart is found in the U.S. Pat. No. 2,967,058 (1961) issued to W. H. Hoffmann, Jr. In Hoffmann, the combination beach barrow and chair is a beach cart having at its terminating end an essentially barrel shaped wheel, a pair of substantially straight frame rails extending from the wheel and meeting to form a handle, and a cloth or similar material sling located between the handle and the wheel. An essentially "U" shaped brace depends perpendicularly from the frame rails, and provides support when the device is used as a beach chair. Unfortunately, Hoffmann's device is difficult to use, in practice. Articles placed within the sling/seat tend to slide forward towards the wheel. This, in turn, places the bulk of the weight being carried behind the wheel, thereby shifting much of the weight to the handle (and therefore, to the user of the device.) Furthermore, the device is bulky and includes no means for folding or otherwise facilitating easy storage.

Other devices have attempted to overcome the problem of bulkiness by introducing foldability. A fine example of such a foldable beach cart may be found in U.S. Pat. No. 3,677,571 (1972) issued to Maturo, Jr. et al. Maturo's device included a pair of matched pivot points which permitted the device to be folded in two places, thereby reducing the device's bulkiness when stored.

Maturo's device, however, included a defect similar to Hoffmann's. In Maturo, the device's "basket" is located forward of the wheel or roller. Therefore, when in use, the device had a tendency to tilt forward, thereby interfering with the device's travel across lose soils such as sand. A user of the device who attempted to overcome this forward tilting tendency would likely lean the device further back, toward the user. So doing had the distinct disadvantage of shifting a greater amount of the payload weight into the hands of the user. In short, Maturo, like Hoffinan, fails to recognize the necessity for a well placed, and easily maintainable, center of gravity.

The beach carts found in the prior art have also sought to provide wheels which are suitable for travel over the loose, particulate surface conditions found at a beach. For example, in Maturo, the wheels are comprised of a single roller assembly having upon it a series of longitudinal and transverse wires which foraminously enclose the wheel. These wires provide far more "bite" into the sandy soil than would a smooth cylindrical or tubular wheel. A slightly different approach to solving the problem of wheel traction on loose soils is found in U.S. Pat. No. 4,362,308 (1982), issued to Hicks et al. In Hicks, the wheel is a single cylinder comprising a pair of oppositely aligned end caps having an axially located center hole therethrough, a ribbed roller section having a plurality of longitudinally extending ribs positioned radially about a longitudinal axis, and an axle which is coaxial with the ribbed roller section and engages the end caps through the center holes.

Applicant has discovered that while incorporation of wire mesh or longitudinal ribs onto the beach cart wheel provides a better bite into loose or granular soils than do smooth wheels, the loose soil still had a tendency to "pile up" in front of the wheel as it moved forward. Such accumulation of materials in front of the wheel forces the user to invest greater effort into moving the beach cart forward in order to pass over the accumulated soils.

The prior art generally known to Applicant also indicates that wheels for use in loose or granular environments such as sand are especially vulnerable to damage caused by the unwanted intrusion of particulate matter into the wheels, wheel hubs, and various friction reduction means such as race bearings. Such intrusion has the unwanted effect of creating additional friction in the wheel which is experienced by the user of the beach cart as "resistance" to pushing or pulling. A further undesirable effect of particulate matter intrusion is the uncontrollable degradation of the wheel component parts, and the of times unanticipated failure of the wheel assembly as a result.

SUMMARY OF THE INVENTION

The instant invention is a foldable hand cart having a roller assembly specially adapted for use on lose soils such as sand, and incorporating a specialized friction reduction means capable of effectively operating in a hostile environment such as sand and salt water. Applicant believes that the independant components of his invention may be useful in many different applications, and therefore the objects which follow should be construed as non-limiting examples.

One object of the present invention is to provide comfortable and simple means for moving items across loose soils such as sand with minimal effort. Applicant's invention accomplishes this object by including a single roller assembly on a framework such that the center of gravity, and hence the bulk of the weight being carried by the device, is placed directly over the roller assembly when the device is in use. Unlike prior art devices which placed the center of gravity behind the roller assembly, or in front of the roller assembly, the configuration of Applicant's frame positions the roller assembly and payload carriers so that the weight of articles being carried is placed directly over the roller assembly, thereby reducing the weight shifted to the device's handle (and ultimately to the user of the device) when the device is in use. The combination of the instant device's framework, payload carriers and roller assembly results in a geometrically formulated and statically positioned balanced loading, which better ensures that the payload will not shift the center loading from directly over the center of the roller assembly.

A further object of the instant invention is to make storage of a hand cart simpler, and easier. Applicant accomplishes this object by creating a frame composed of two separate frame members connected to one another at a pair of pivot points. Applicant refers to this arrangement as a rotational scissors fold. The rotational scissors fold makes possible the folding of the device into a nearly flattened configuration, thereby accommodating easy storage in limited spaces. The rotational scissors fold also assists in better positioning the device's center of gravity when in use. Unlike prior art devices which simply fold the basket section (or payload carrying section), Applicant's device folds in a manner which permits the entire framework to fold against itself, thereby significantly decreasing the amount of space the device occupies when it is fully closed. Furthermore, Applicant's design incorporates a payload carrying component which, when fully assembled, results in a frame which is substantially "self-locking". This eliminates the need for specialized locking means when fully assembled by utilizing the various payload bearing portions of the device to lock the frame in its open or at use position.

A further object of the instant invention is to make travel across loose soils more efficient and less labor intensive. Applicant accomplishes this objective by incorporating a roller assembly which is in essence a single hollow cylinder or tube having at each end a somewhat larger diameter treaded wheel. The hollow cylinder or tube further has no internal axial shaft and has extending axially from its outer surface a number of wave form ridges. Applicant has discovered that these wave form ridges tend to move the loose soil rightwardly and leftwardly, toward the wheel hubs, as the roller assembly turns during use. In Applicant's device, the ridges are not simply a means for better gripping loose soil, but actually assist in moving the loose soil toward the treaded wheels, thus further reducing soil build up in front of the roller assembly. Applicant has found that urging the soil in the direction of the hubs as the roller assembly travels is an effective way to decrease resistance when moving over loose soils.

Like the prior art wheels having ridges, the transaxial cross sectional diameter of the hollow cylinder or tube is less than the outer diameter of the two attached treaded wheels. However, unlike the prior art wheels having ridges, Applicant's ridges push the soil toward a space between the wave form vanes and the treaded wheels and thus away from the hollow cylinder rather than piling the loose soil up in front or behind the roller assembly, as the prior art did. Applicant's "wave form" roller assembly ridges terminate some distance from the treaded wheels, leaving a space between the terminating edge of ridge and the treaded wheel. When in use, soft surface elements (sand, loose dirt, snow, etc.) are ejected freely between the terminating edges of the wave form ridges and the treaded wheel. Furthermore, the wave form ridge design has been determined to provide the same beneficial surface travel characteristics whether the roller assembly is moving forward or backward.

A final object of the instant invention is to provide friction reduction means which not only reduce friction, but also are somewhat self cleaning, easily removable and replaceable. Applicant accomplishes this object by incorporating in the instant invention a so-called "wear bearing". This wear bearing is a pair of concentricly mounted sleeves, the outer sleeve having a waste ejectment means passing completely through the sleeve's inner and outer surface, the waste ejectment means being co-axial with a radial axis.

When fully assembled, the outer sleeve fits tightly within a wheel mounting block such that the outer sleeve will not rotate when the roller assembly rotates. The wheel mounting block has a hollow tubular passage passing through it coaxially with the waste ejectment means. The inner sleeve is then attached to the wheel so that the inner sleeve moves with the wheel when the roller assembly turns. The roller assembly is then mounted onto the device by sliding the inner sleeves into the outer sleeves such that the outer sleeve waste ejection means is directly adjacent to the outer surface of the inner sleeve. The wheel mounting blocks are then attached to the first frame member.

The mounting blocks are further detachably mounted to the foldable hand cart. This permits them (and the roller assembly) to be removed during disassembly, thus further reducing the overall length of the device, and simplifying storage and transport.

In operation, small quantities of sand and other particulate matter are likely to work their way into the friction reduction means. In the prior art, this meant that sand and other matter would find its way into the standard race bearings or other friction reduction means most often utilized. These unwanted materials would then abrasively and or corrosively damage the friction reduction means However, in Applicant's device, materials entering the friction reduction means are trapped between the inner and outer sleeve, and when possible, mechanically crushed into a fine powder between the inner sleeve and the outer sleeve as the wheel turns. Materials which are not so crushed, and the remnants of those which are, will slowly be displaced from within the friction reduction means by eventually entering the outer sleeve waste ejection means. Gravity and centripetal forces then tend to pull the particulate matter remnants through the outer sleeve waste ejection means during the rotation of the roller assembly, and then permit the remnants to pass out of the mounting block hollow tubular passage and back onto the ground.

Applicant's device therefore overcomes the significant problem of worn bearings by using the friction reduction means to pulverize particulate matter and eject the remaining matter from within the friction reduction means.

Applicant recognizes that the mechanical action of pulverizing and ejecting materials which find their way into the friction reduction means is likely to cause the inner sleeve and the outer sleeve to wear. However, this leads to the final useful object of Applicant's invention. The wear bearings utilized in Applicant's device are easily removable, and inexpensive to replace. Rather than creating a complex means for trying to keep particulate matter out of the friction reduction means, Applicant has created a new form of friction reduction means, the wear bearing, which can tolerate the intrusion of particulate matter and essentially self-clean. Once the wear bearing has been severely enough damaged by the unwanted particulate matter that it is no longer able to self-clean, or ceases to function effectively as a friction reduction means, it may be quickly, easily and inexpensively removed and replaced. Applicant believes that his wear bearing should be considered not as a "planned obsolescence" component, but rather one which will best serve the user when treated as a "regularly maintenanced" component, much the same as one treats the pads on a set of automobile disc brakes.

A DESCRIPTION OF THE DRAWINGS

Figure 4:
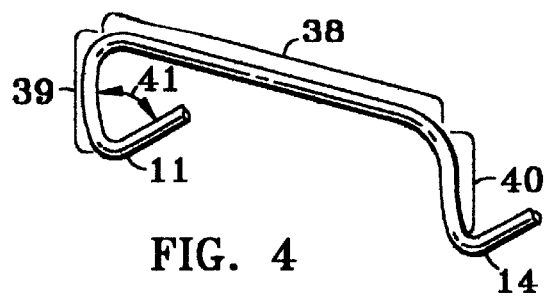

FIG. 4. is a close up perspective of the second cross member of the first frame member.

Figure 5:
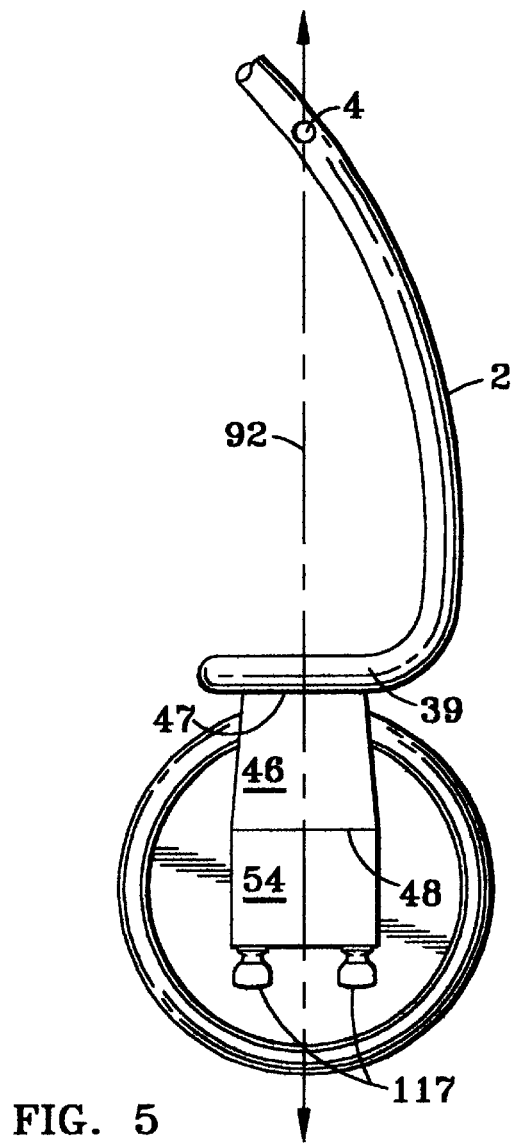

FIG. 5 is a side view of a section of the first frame member, first wheel mounting block and the roller assembly.

Figure 6:
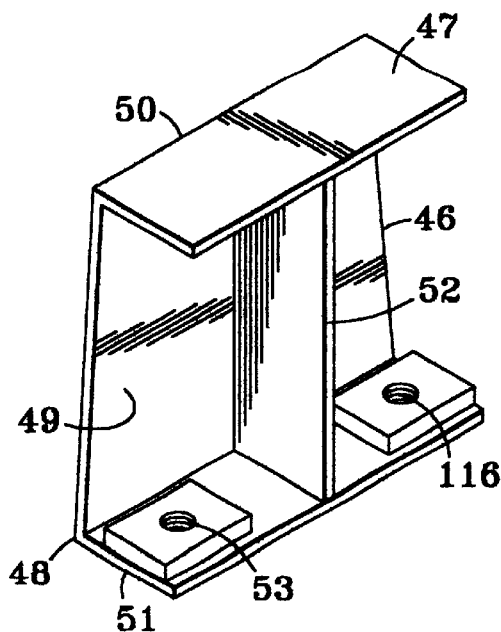

FIG. 6 is a perspective view of the first wheel riser.

Figure 7:
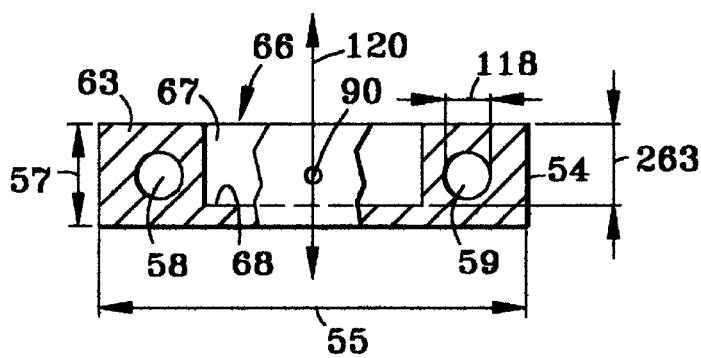

FIG. 7 is a side cross sectional view of the first wheel mounting block.

Figure 8:
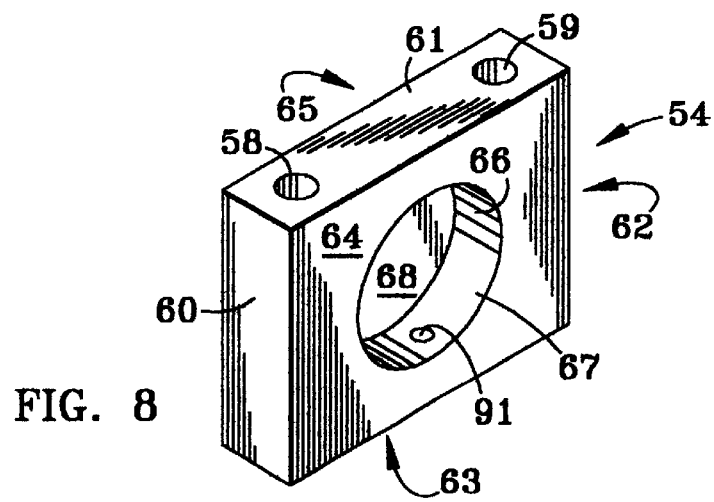

FIG. 8 is a perspective view of the first wheel mounting block.

Figure 9:
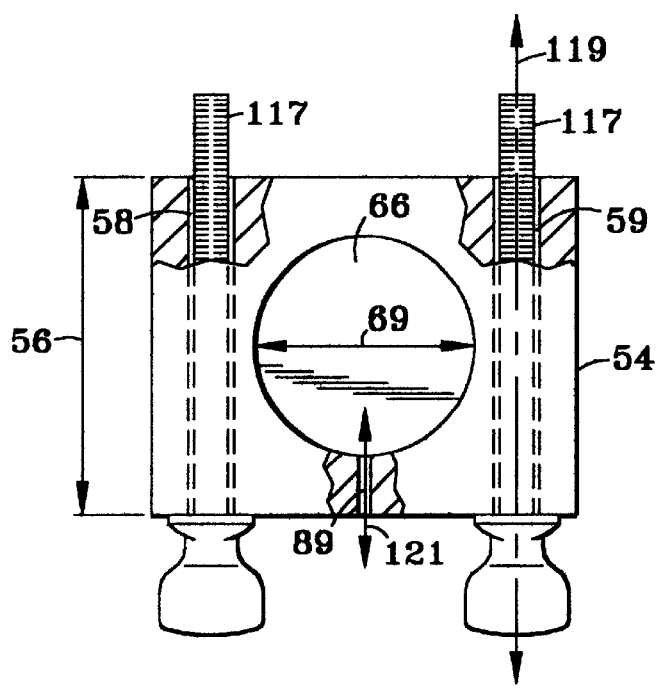

FIG. 9 is a partially cut away view of the first wheel mounting block showing the tubular passages exposed.

Figure 10:
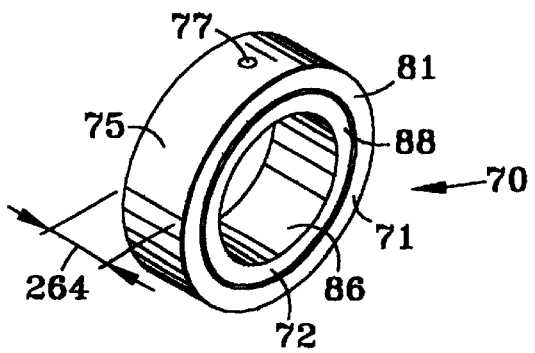

FIG. 10 is a perspective view of the wear bearing.

Figure 11:
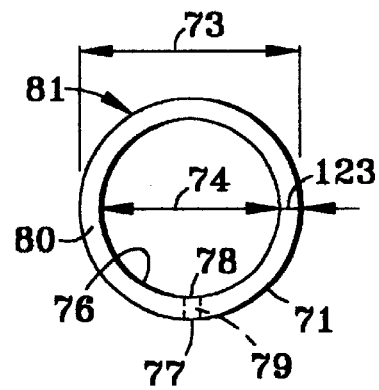

FIG. 11 is a plan view of the wear bearing outer sleeve.

Figure 12:
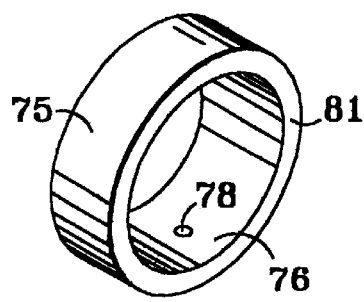

FIG. 12 is a perspective view of the wear bearing outer sleeve.

Figure 13:
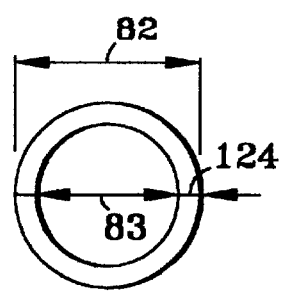

FIG. 13 is a plan view of the wear bearing inner sleeve.

Figure 14:
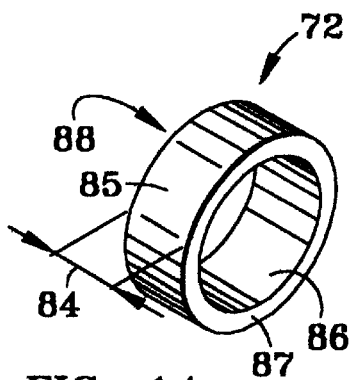

FIG. 14 is a perspective view of the wear bearing inner sleeve.

Figure 15:
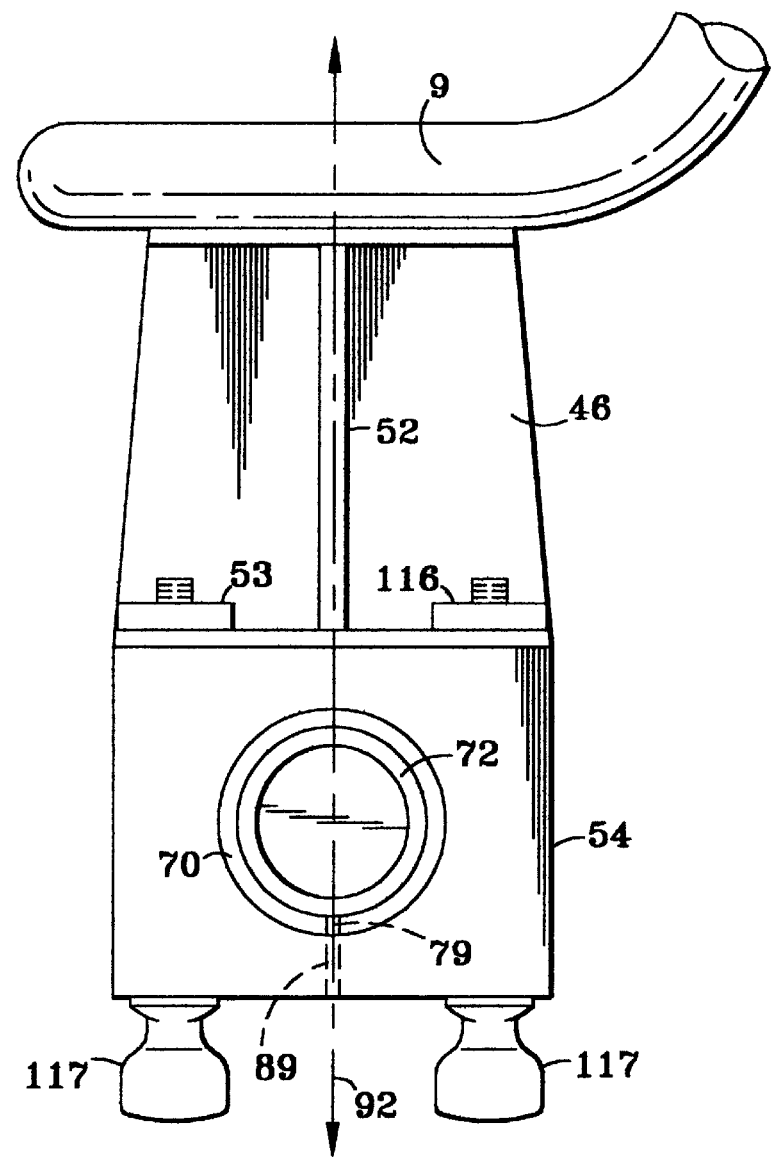

FIG. 15 is a plan view of the assembled wear bearing, first wheel mounting block and first wheel riser.

Figure 16:
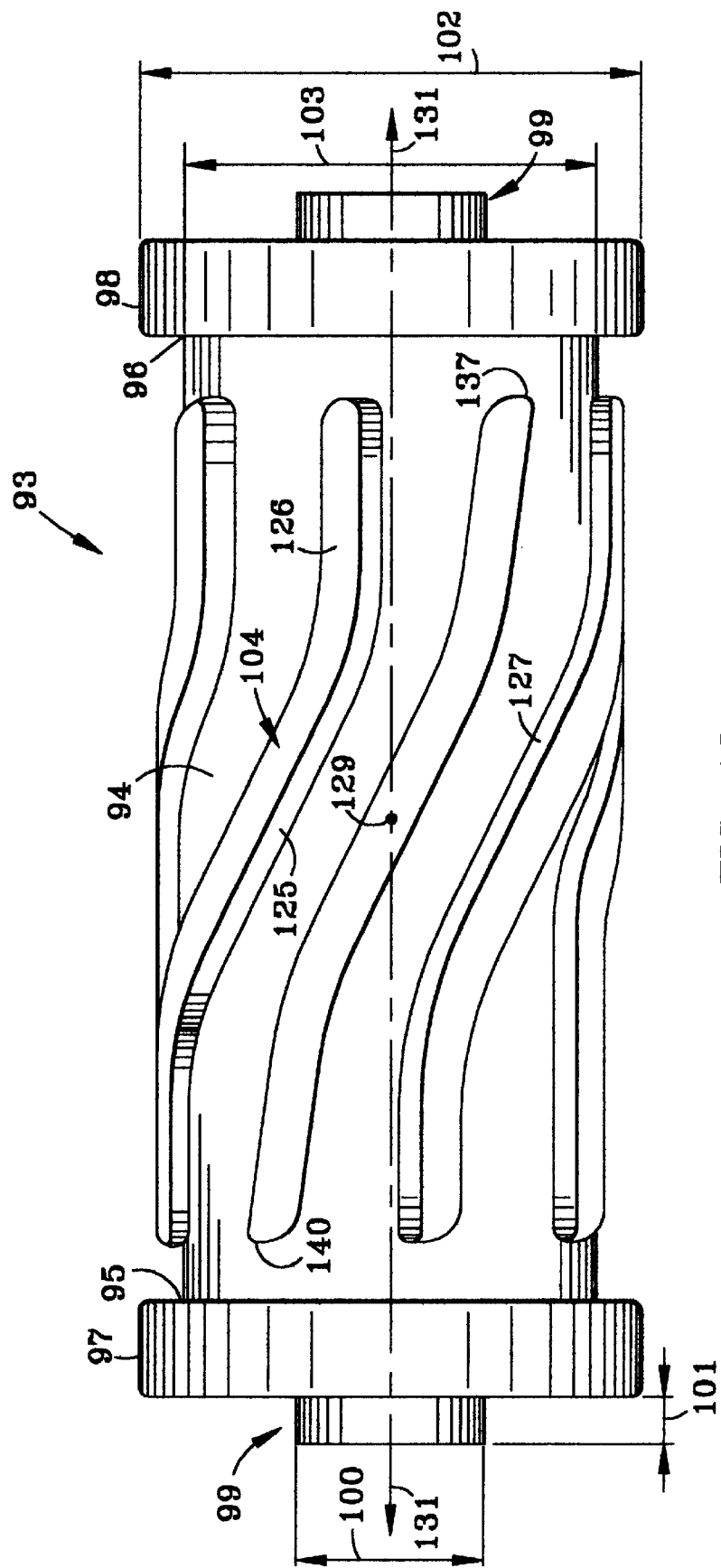

FIG. 16 is a perspective view of the roller assembly with wave form vanes.

Figure 17:
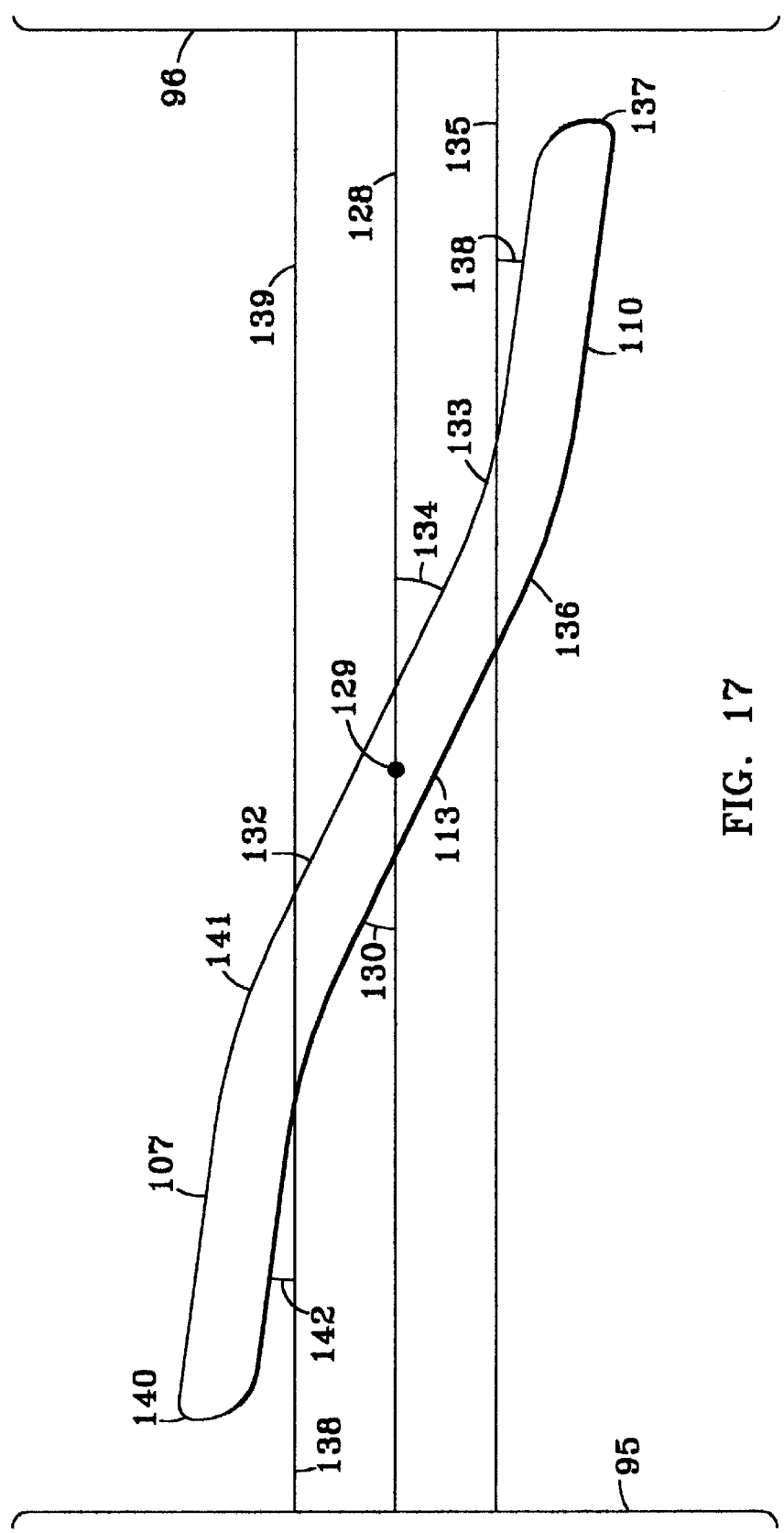

FIG. 17 is a diagrammatic view of a portion of the roller assembly with a wave form vane.

Figure 18:
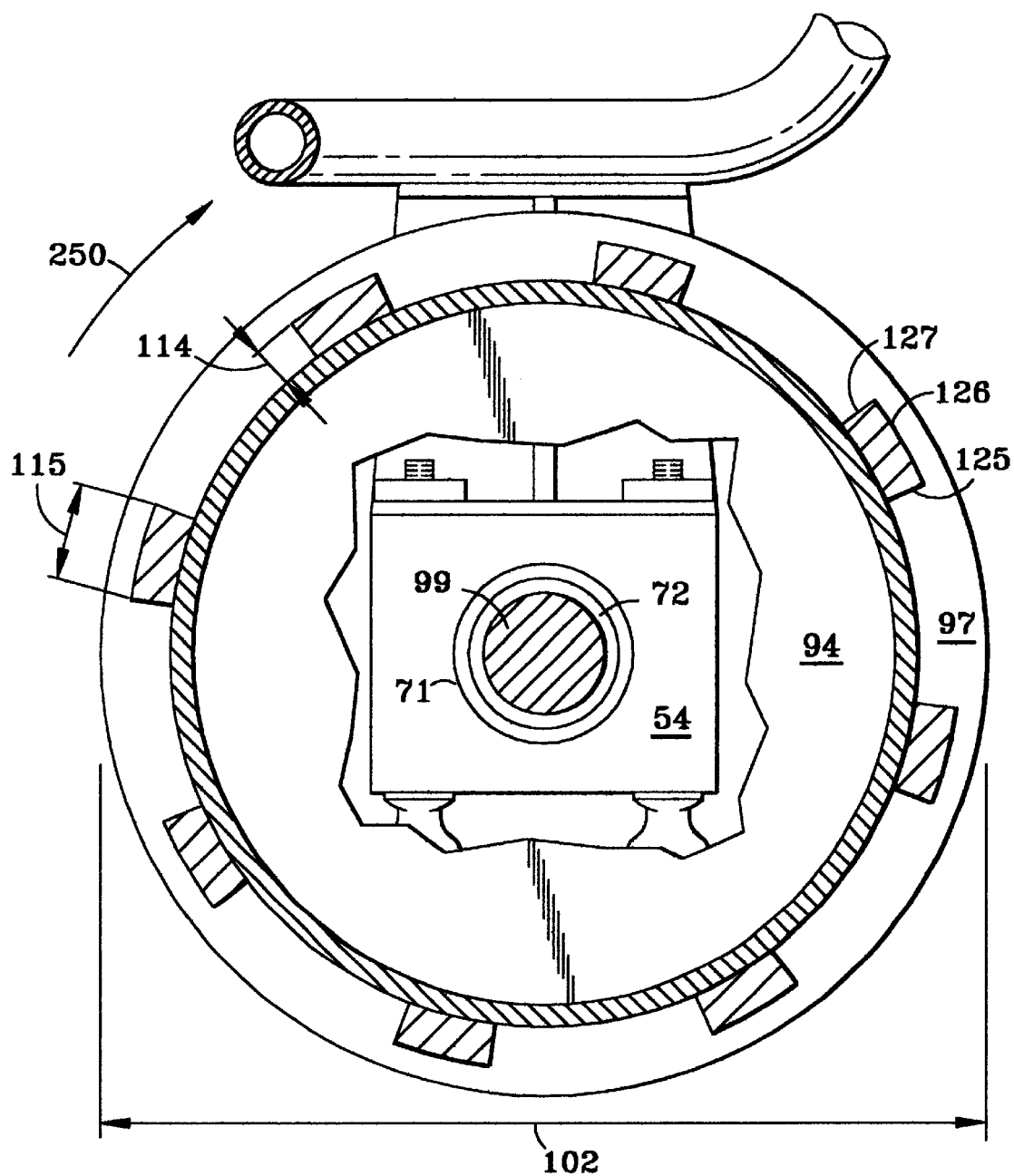

FIG. 18 is a side elevational view of the wheel and wheel mounting block.

Figure 19:
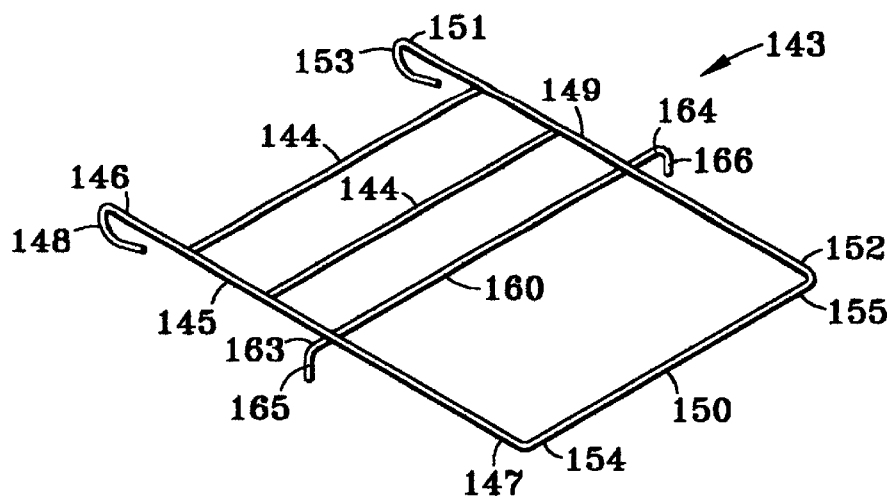

FIG. 19 is a perspective view of the first payload carrier.

Figure 20:
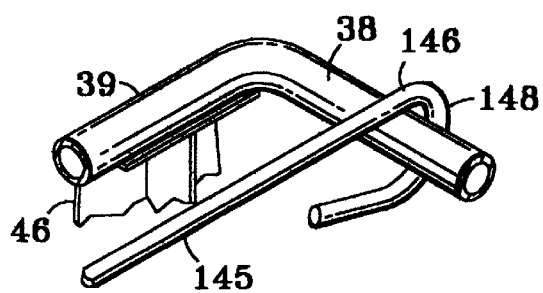

FIG. 20. is a close up partial view of the first frame member and the attached first payload carrier.

Figure 21:
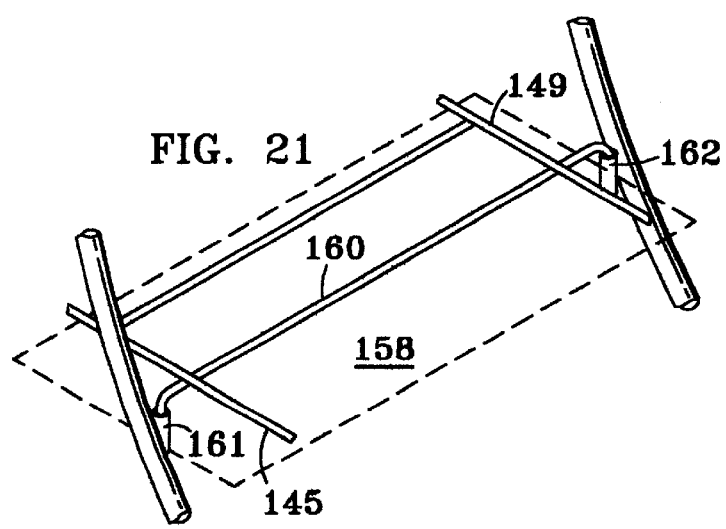

FIG. 21 is a close up perspective partial view of the second frame member and the attached first payload carrier.

Figure 22:
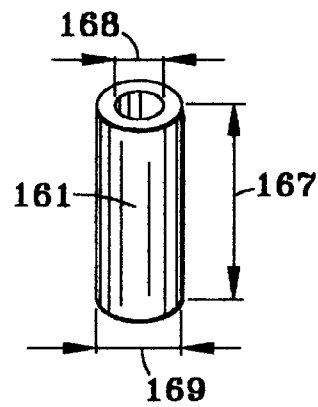

FIG. 22 is a close up perspective view of the first ferrule.

Figure 23:
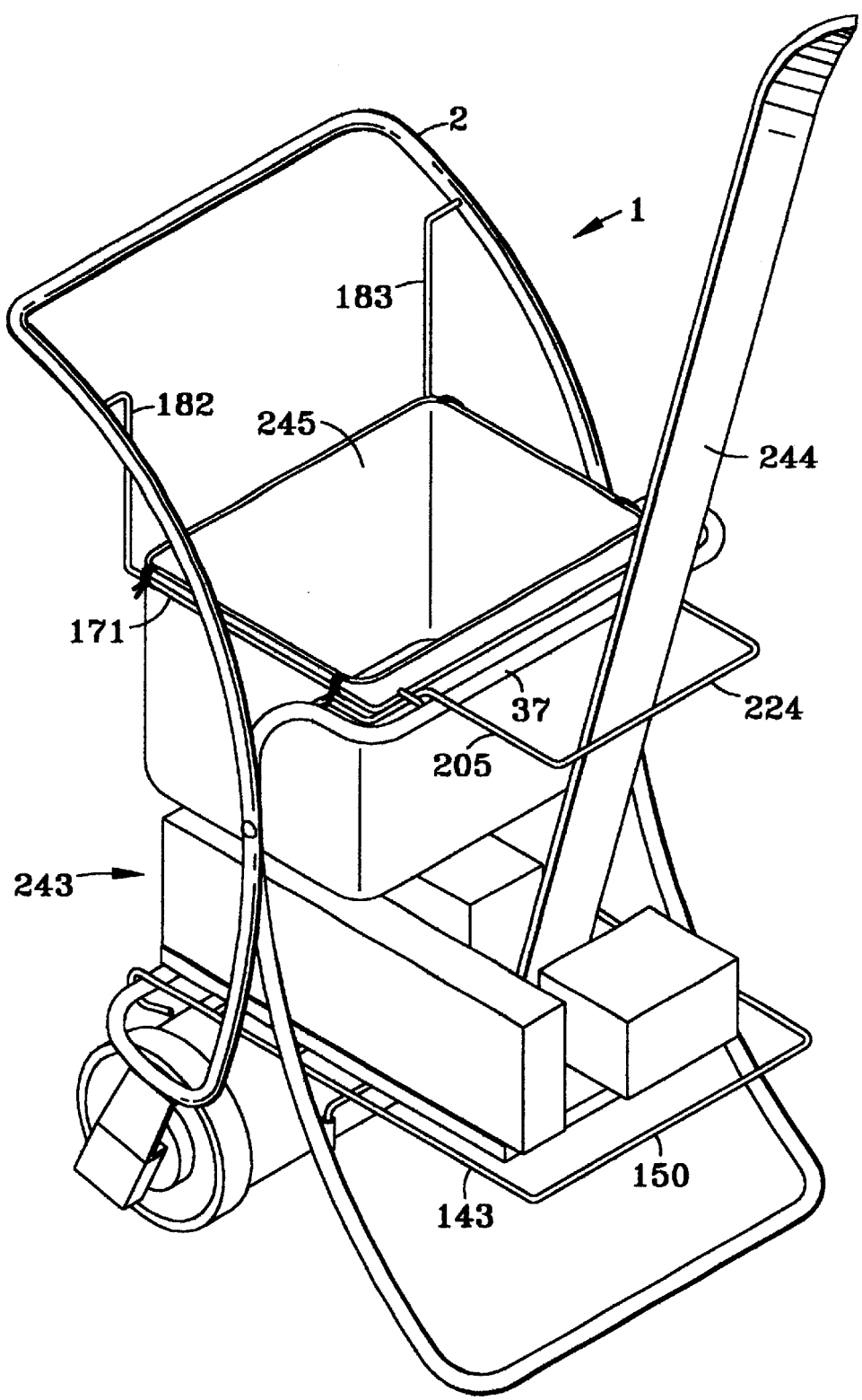

FIG. 23 is a perspective view of the assembled hand cart with payload in place.

Figure 24:
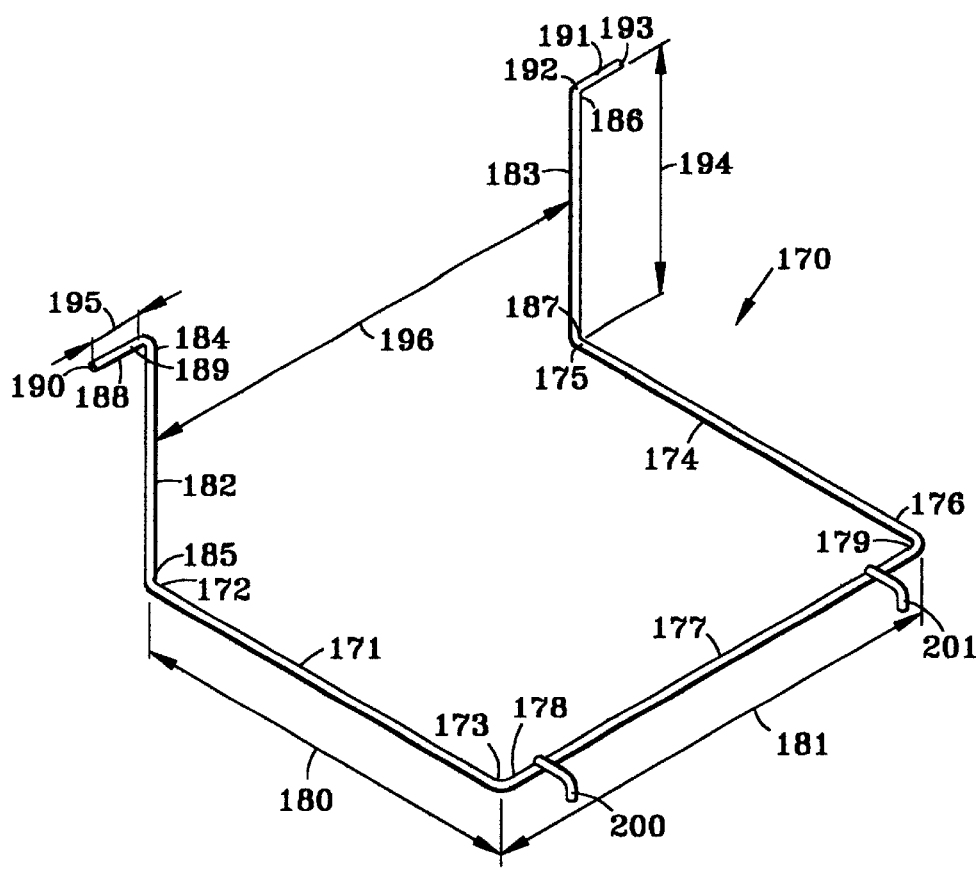

FIG. 24 is a perspective view of the second payload carrier.

Figure 25:
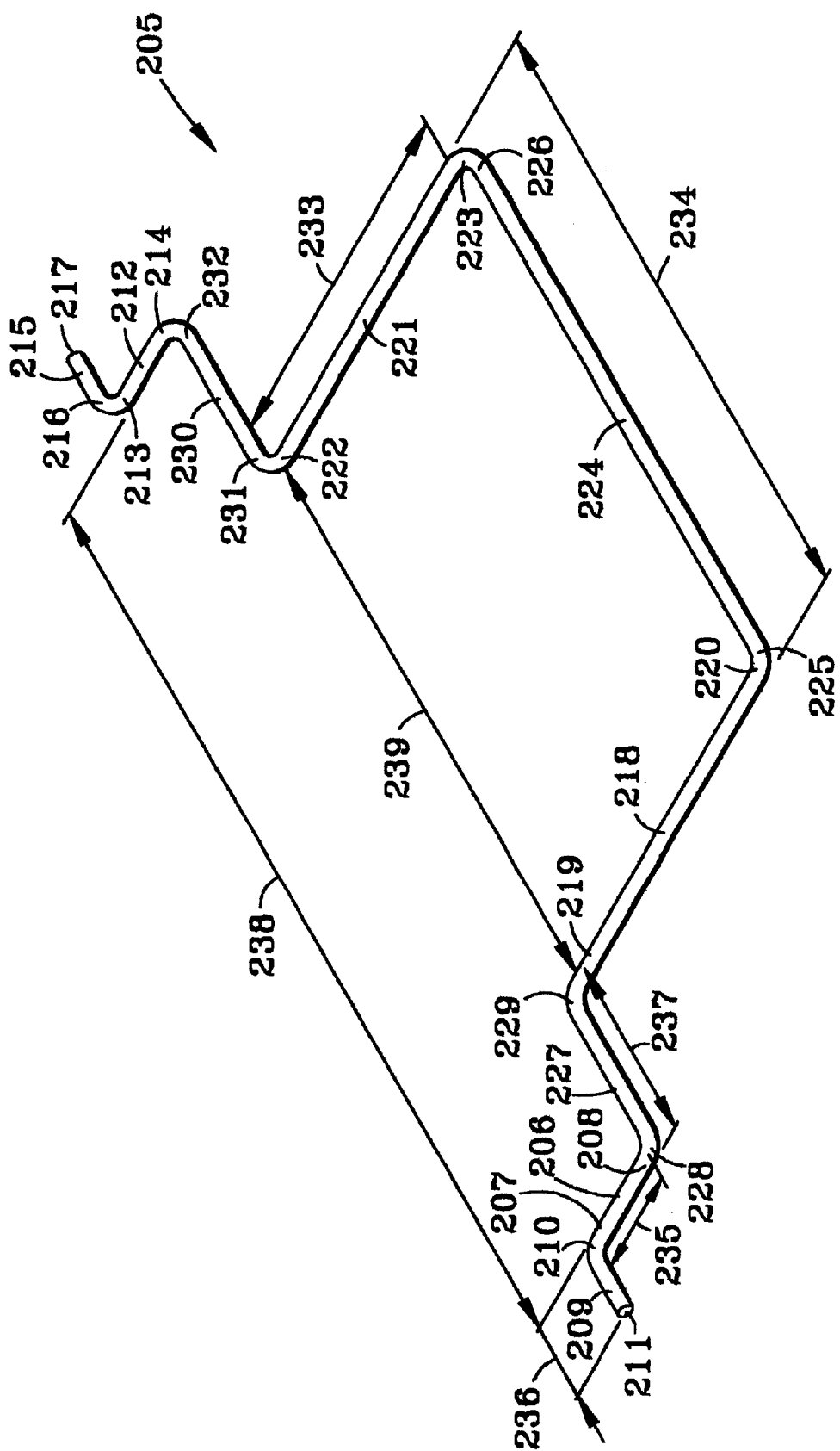

FIG. 25 is a perspective veiw of the third payload carrier.

Figure 26:
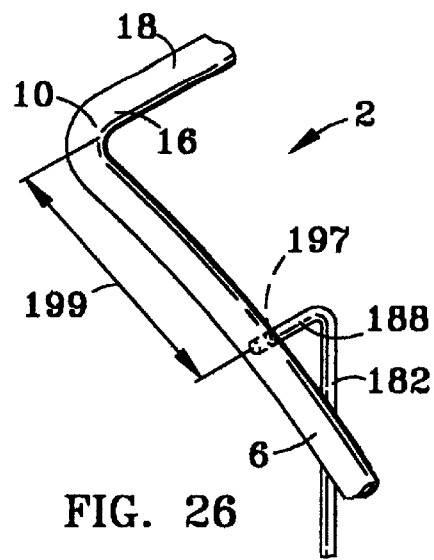

FIG. 26 is a close up perspective partial view of the first frame member and the second payload carrier.

Figure 27:
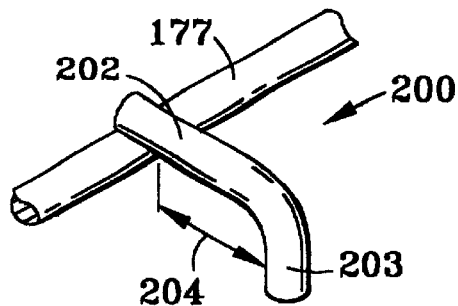

FIG. 27 is a close up perspective partial view of the second payload carrier and the first wedging means.

Figure 28:
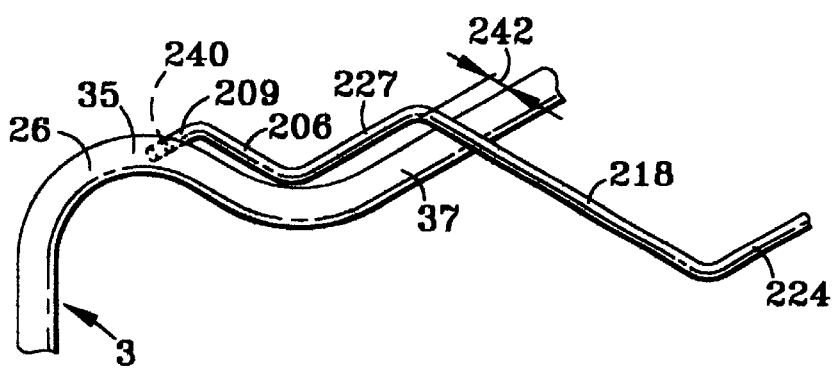

FIG. 28 is a close up perspective partial view of the second frame member and the third payload carrier.

Figure 29:
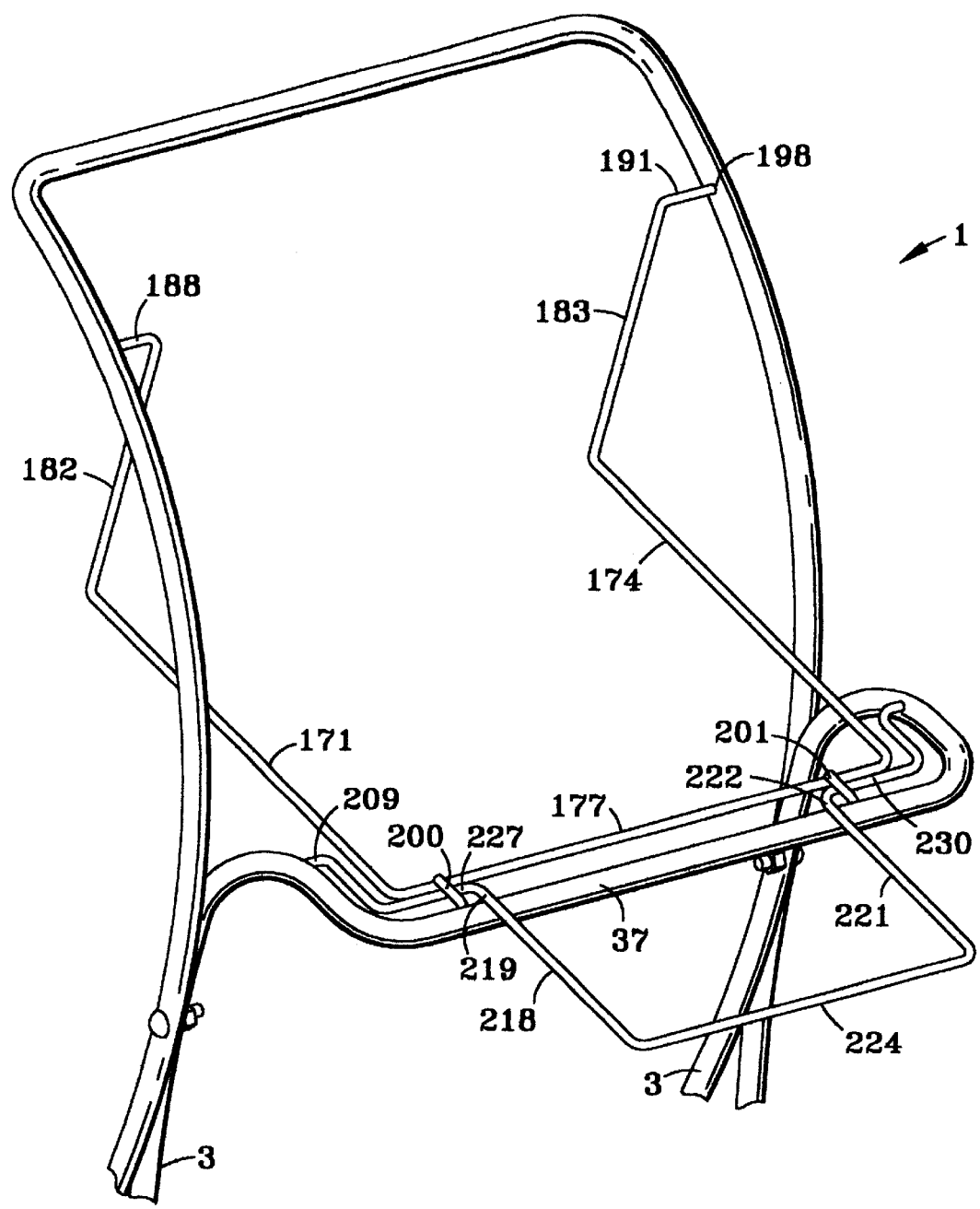

FIG. 29 is a perspective partial view of the first frame member, second frame member, second payload carrier and third payload carrier.

Figure 30:
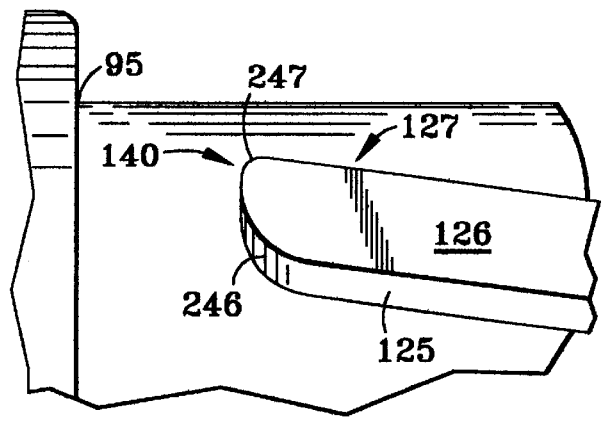

FIG. 30 is a close up perspective view of the wave form vane.

Figure 31:
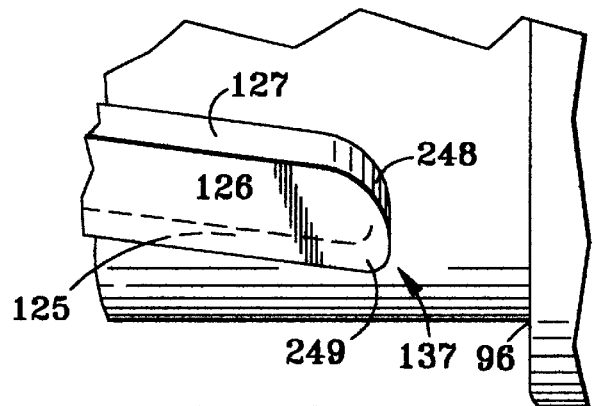

FIG. 31 is a close up persective view of the opposite end of the wave form vane.

Figure 32:
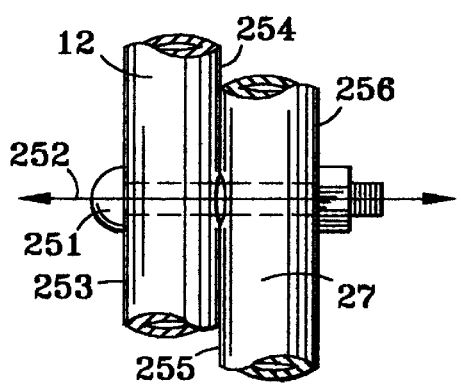

FIG. 32 is a close up partial view of the first pivot area.

Figure 33:
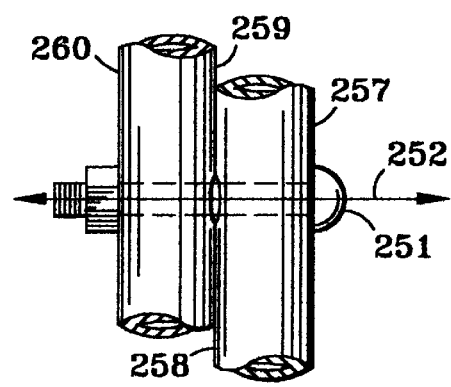

FIG. 33 is a close up partial view of the second pivot area.

Figure 34:
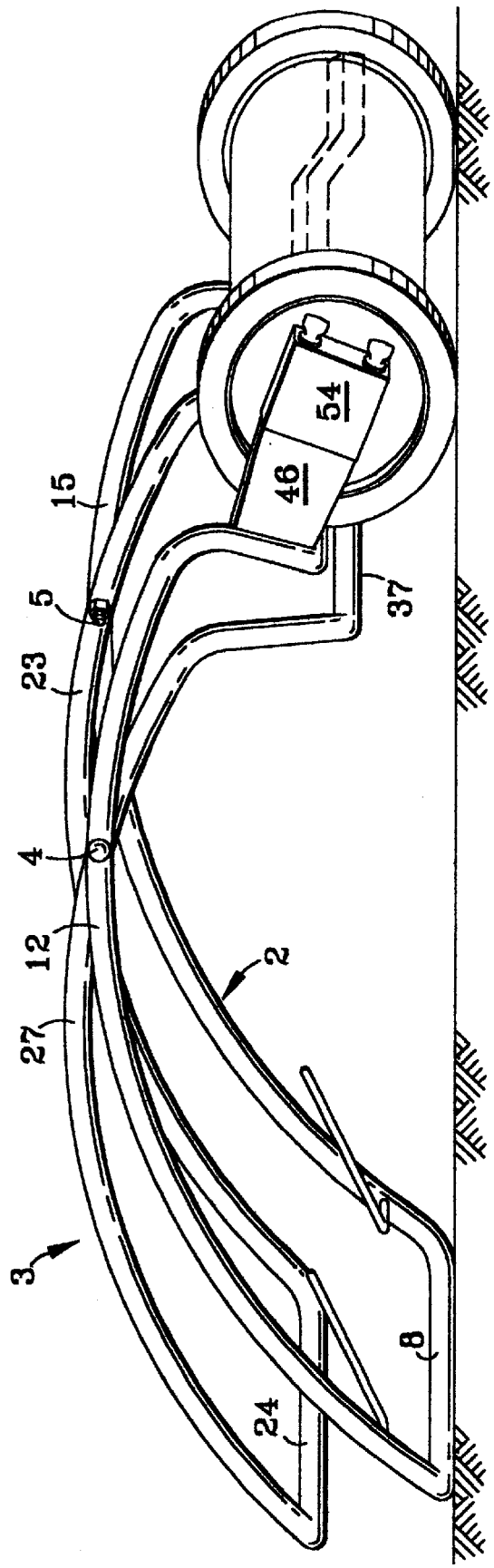

FIG. 34 is a perspective view of the hand cart folded flat and not in use.

Figure 35:
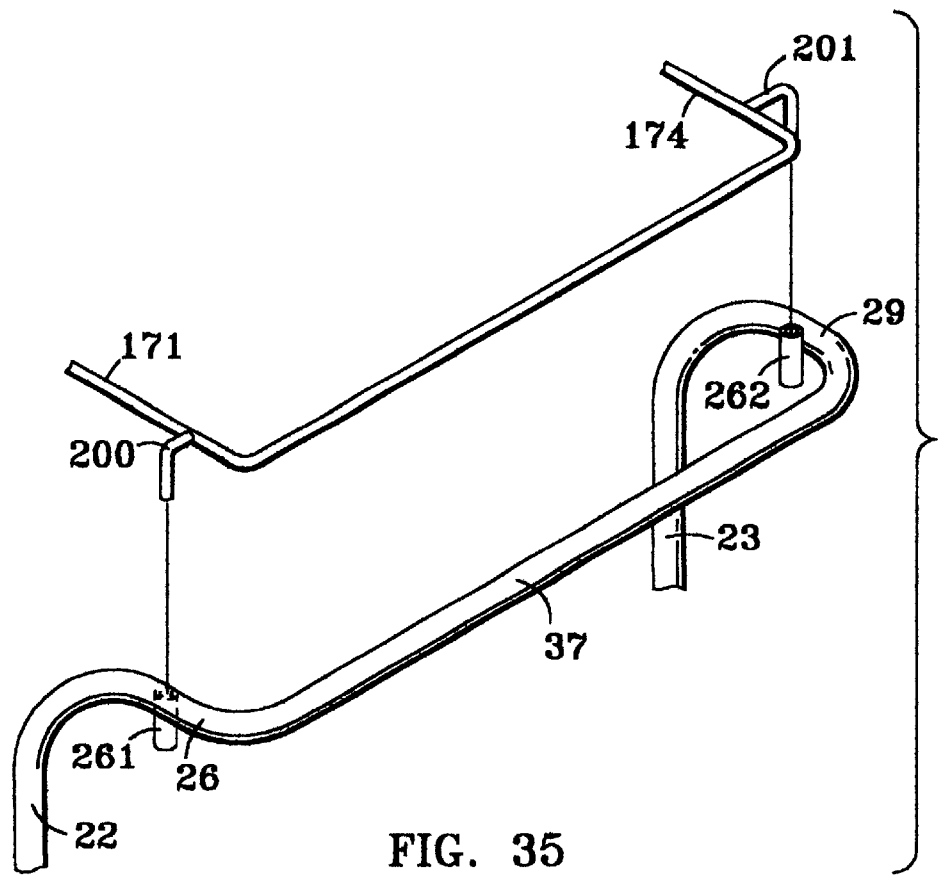

FIG. 35 is a close up perspective view of another embodiment of the hand cart.

Figure 36:
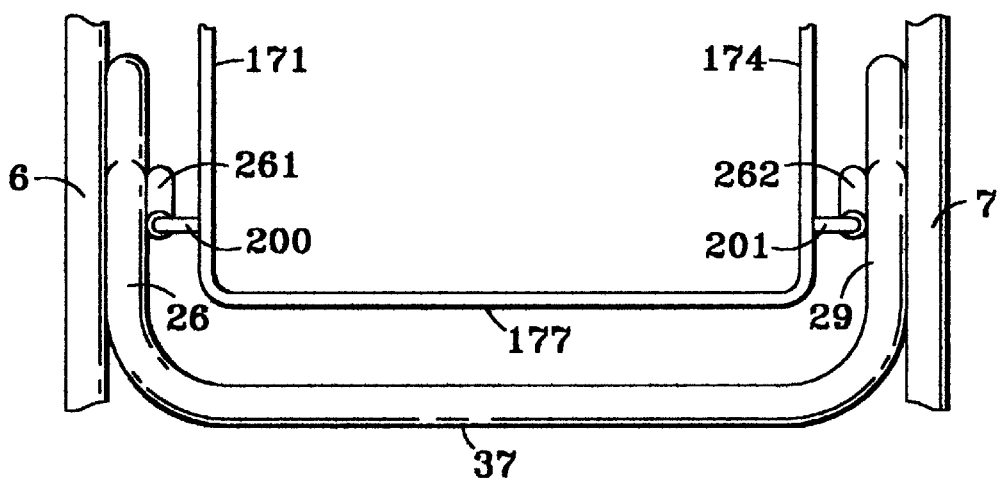

FIG. 36 is an overhead view of another embodiment of the hand cart.

Figure 37:
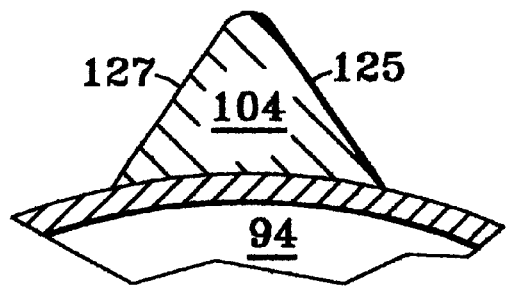

FIG. 37 is a side cross sectional view of another embodiment of the wave form vane.

Figure 38:
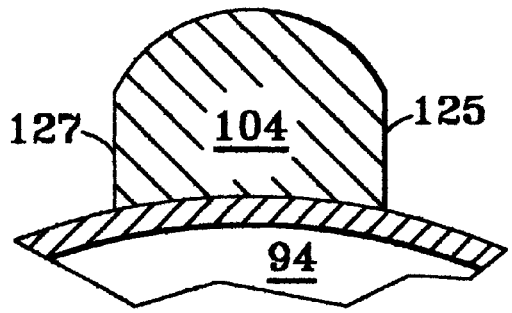

FIG. 38 is a side cross sectional view of another embodiment of the wave form vane.

Figure 39:
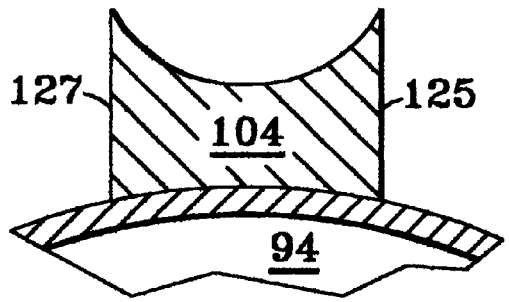

FIG. 39 is a side cross sectional view of another embodiment of the wave form vane.

A DESCRIPTION OF THE PREFERRED EMBODIMENT

As per FIGS. 1, 2, 3, 5 and 34, the foldable frame (1) is constructed of a first frame member (2) and a second frame member (3). The first frame member (2) is nearly identical in form to the second frame member (3), and is identical in size. The first frame member (2) and the second frame member (3) are pivotably connected to one another at a frame first pivot area (4) and a frame second pivot area (5). These pivotable connections permit the first frame member (2) and the second frame member (3) to pivot relative to one another in what Applicant calls a "rotational scissors fold".

Figure 1:
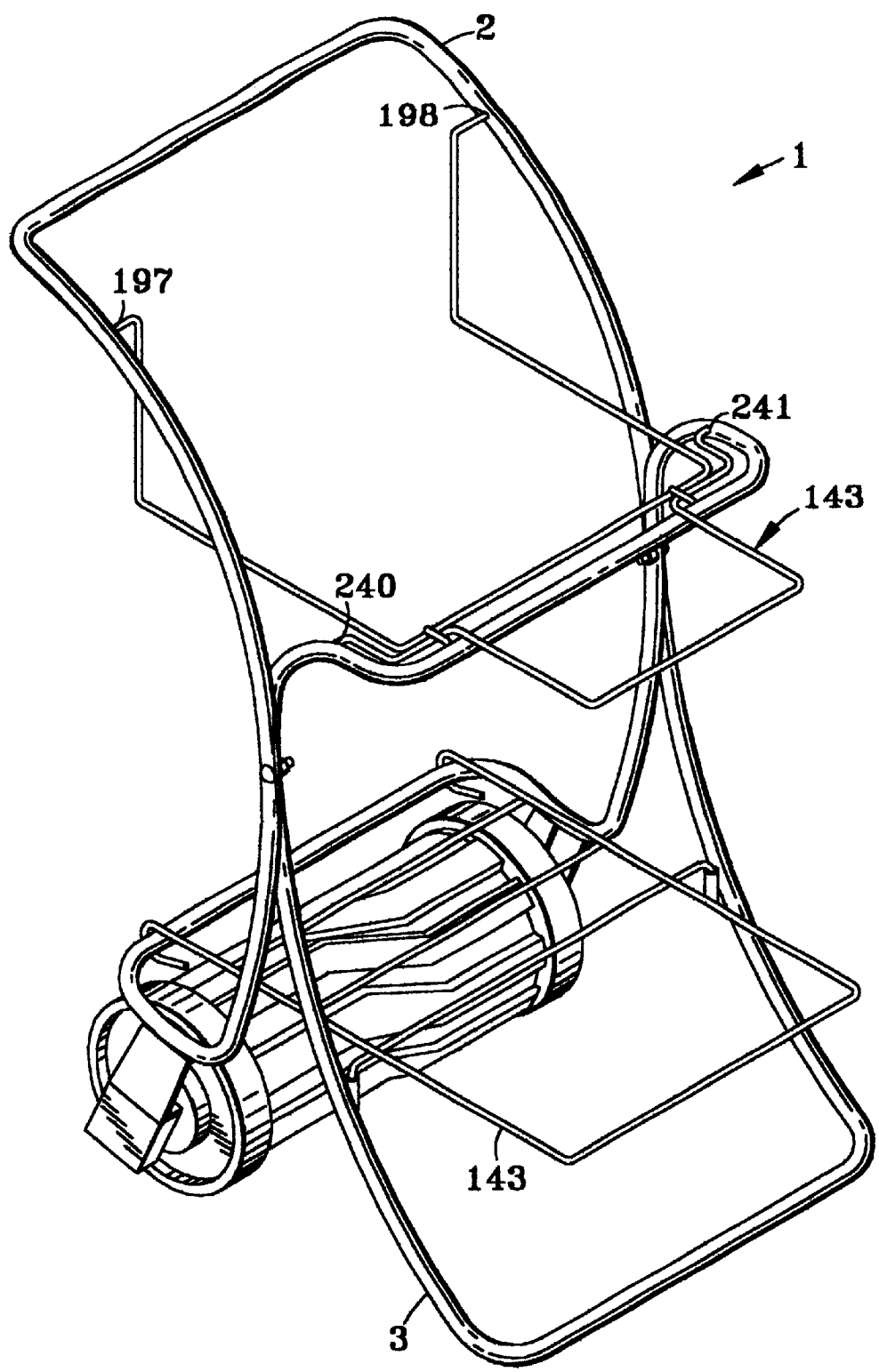
FIG. 1 is a perspective view of the assembled hand cart.
Figure 2:
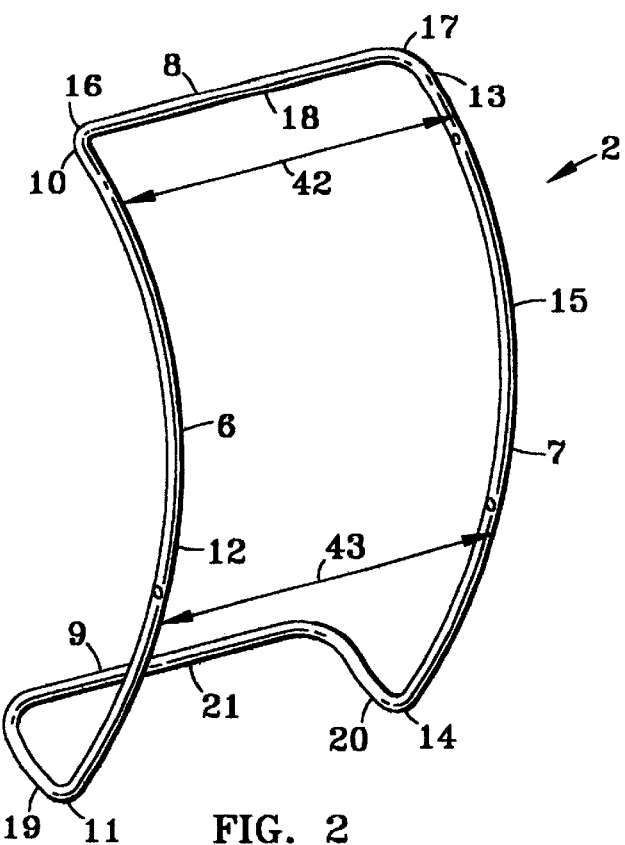
FIG. 2 is a perspective view of the first frame member.
Figure 3:
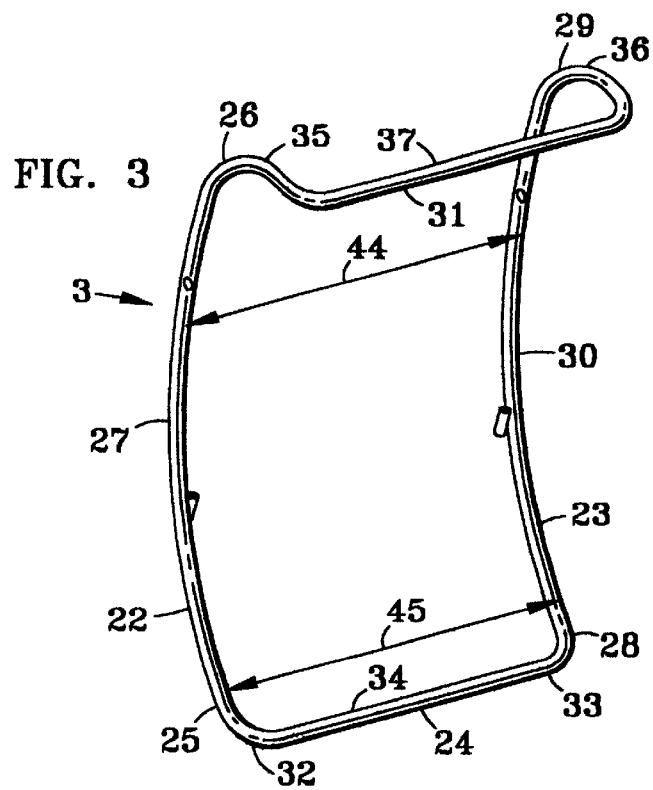
FIG. 3 is a perspective view of the second frame member.

As per FIGS. 1, 2 and 3, in the preferred embodiment, the first frame member (2) is constructed from a substantially rigid, strong, tubular material. Applicant has found that tubular aluminum provides sufficient strength and rigidity, while still being light enough to handle with ease, once assembled. In the preferred embodiment, Applicant utilizes aluminum tubing having a diameter of 1 inch. Should steel be the material of choice, Applicant recommends a steel tube having a diameter of ¾ of one inch. The precise materials and dimensions may easily be varied so long as the chosen material and dimension is strong enough to carry the desired load weight without breaking, deforming or bending the frame (1).

As per FIG. 2, the first frame member (2) is composed of a first arched side (6), a second arched side (7) a first cross member (8) and a second cross member (9). The first arched side (6) has a first end (10) a second end (11) and an arc shaped mid-body (12), the mid-body spanning between the first end (10) and the second end (11). The second arched side (7) also has a first end (13), a second end (14) and an arc shaped mid-body (15), the mid-body spanning between the first end (13) and the second end (14). The first cross member (8) has a first end (16), a second end (17), and an essentially linear shaped mid-body (18), the mid-body (18) spanning between the first end (16) and the second end (17). The second cross member (9) has a first end (19), a second end (20) and an essentially "U" shaped mid-body (21), the mid-body (21) spanning between the first end (19) and the second end (20). As per FIG. 2, the first arched side (6) is attached at the first arched side first end (10) to the first cross member first end (16). The first cross member second end (17) is attached to the second arched side first end (13). The second arched side second end (14) is attached to the second cross member second end (20). The second cross member first end (19) is attached to the first arched side second end (11). In the preferred embodiment, the attachments are accomplished through welding the individual components to one another, thereby assuring a strong attachment and creating an overall substantially rigid first frame member (2).

As per FIGS. 1 and 3, in the preferred embodiment, the second frame member (3) is constructed from a substantially rigid, strong, tubular material in the same fashion as the first frame member (2). Furthermore, the second frame member (3) is essentially identical in form to the first frame member (2).

As per FIG. 3, the second frame member (3) is composed of a first arched side (22), a second arched side (23) a first cross member (24) and a second cross member (31). The first arched side (22) has a first end (25) a second end (26) and an arc shaped mid21 body (27), the mid-body spanning between the first end (25) and the second end (26). The second arched side (23) also has a first end (28), a second end (29) and an arc shaped mid-body (30), the mid-body spanning between the first end (28) and the second end (29).

The second frame member (3) first cross member (24) has a first end (32), a second end (33), and an essentially linear shaped mid-body (34), the mid-body (34) spanning between the first end (32) and the second end (33). The second frame member second cross member (31) has a first end (35), a second end (36) and an essentially "U" shaped mid-body (37), the mid-body (37) spanning between the first end (35) and the second end (36).

As per FIG. 3, the second frame member (3) first arched side (22) is attached at the first arched side first end (25) to the first cross member first end (32). The first cross member second end (33) is attached to the second arched side first end (28). The second arched side second end (29) is attached to the second cross member second end (36). The second cross member first end (35) is attached to the first arched side second end (26). In the preferred embodiment, as with the first frame member (2), the second frame member (3) attachments are accomplished through welding the individual components to one another, thereby assuring a strong attachment and creating an overall substantially rigid first frame member (3).

As per FIGS. 2, 3 and 4, it is useful to further describe the form of the second cross member. The first frame member second cross member (9) and the second frame member second cross member (31) are identical in form. Therefore, for simplicity's sake, only the first frame member second cross member (9) will be described in detail.

The first frame member second cross member (9) has been described as essentially "U" shaped. By "U" shaped Applicant means that the second cross member may be considered as having a cross member base (38), a cross member first leg (39) and a cross member second leg (40). The cross member first leg (39) is attached to the cross member base (38) and the first arched side second end (11), the cross member second leg (40) is attached to the cross member base (38) and the second arched side second end (14). It should be readily understood that the cross member first leg (39) and the cross member second leg (40) are parallel to, axially offset, and co-planar with, one another. Furthermore, the cross member first leg (39) and the cross member second leg (40) are perpendicular to, and co-planar with, the cross member base (38). When assembled into a completed device, the cross member first leg (39) and the first arched side (6) are connected to one. Applicant prefers the cross member first leg (39) and the first arched side (6) to be connected to one another such that a leg to arched side angle (41) of approximately 85 degrees is formed between them. Applicant believes that such a leg to arched side angle provides greater stability when the device is in use, and serves to maintain the payload mass directly over the roller assembly when in use. This pattern is repeated with the cross member second leg (40) and the second arched side (7). At the point of attachment between the cross member first leg (39) and the first arched side second end (11), the first arched side and the cross member first leg are essentially perpendicular to and co-planar with, one another. This relationship is repeated for the cross member second leg (40) and the second arched side (7).

As was noted above, the first frame member (2) and the second frame member (3) are nearly identical in configuration. Therefore, it should be understood that the relationship between the first frame member second cross member first leg (39) and the first frame member first arched side (41) is the same as the relationship between the second frame member second cross member first leg and the second frame member first arched side. So too, the relationships among the first frame member second cross member base (38) and the first frame member second cross member first leg (39) and the first frame member second cross member second leg (40) are the same as the relationship among the second frame member second cross member base and the second frame member second cross member first leg and the second frame member second cross member second leg.

As per FIGS. 1 and 2, the first frame member first arched side (6) and the first frame member second arched side (7) are parallel to one another. Therefore, a first distance (42) between the first arched side (6) and the second arched side (7), the first distance (42) being measured proximate to the first cross member (8) is equal to a second distance (43) between the first arched side (6) and the second arched side (7), the second distance (43) being measured proximate to the second cross member (9).

So too, the second frame member first arched side (22) and the second frame member second arched side (23) are parallel to one another. Therefore, a third distance (44) between the first arched side (22) and the second arched side (23), the third distance (44) being proximate to the second cross member (31) is equal to a fourth distance (45) between the first arched side (22) and the second arched side (23), the fourth distance (45) being proximate to the first cross member (24).

In the preferred embodiment, the dimensions of the first frame member first arched side (6) and the first frame member second arched side (7) are identical. The dimensions of the second frame member first arched side (22) and the second frame member second arched side (23) are also identical. Finally, the dimensions of the first frame member first arched side (6) and the second frame member first arched side (22) are identical.

Applicant believes however, that the first distance (42) and the third distance (44) should not be identical. In the preferred embodiment, the third distance (44) is less than the first distance (42), the third distance being approximately 18 inches and the first distance being approximately 19 and ½ inches. Applicant has found that this arrangement works best as it permits the assembly of the instant invention in such a fashion that when fully assembled, as per FIG. 1, the second frame member first arched side (22) and the second frame member second arched side (23) fit between the first frame member first arched side (6) and the first frame member second arched side (7). Clearly, it would be possible to vary this arrangement such that the third distance (44) and the fourth distance (45) were somewhat greater than the first distance (42). In that case, the first frame member first arched side (6) and the first frame member second arched side (7) would fit between the second frame member first arched side (22) and the second frame member second arched side (23). Furthermore, these measurements could be varied in order to change the overall dimensions of the frame such that a larger or small cart could be manufactured, according to the user's needs.

As was noted above, the first frame member (2) and the second frame member (3) are pivotably connected to one another at the frame first pivot area (4) and the frame second pivot area (5). In the preferred embodiment of the frame, as per FIGS. 1 and 37, the frame first pivot area is a hole having a bore passing through the first frame member first arched side arc shaped mid-body (12), the hole passing through both the first frame member first arched side outboard surface (253) and the first frame member first arched side inboard surface (254), and an aligned hole passing completely through the second frame member first arched side arc shaped mid-body (27), the hole passing through both the second frame member first arched side outboard surface (256) and the second frame member first arched side inboard surface (255). When fully assembled, a frame pivot fastener (251) may be passed through the first frame member first arched side arc shaped mid-body (12) and the second frame member first arched side arc shaped mid-body (27) such that the frame pivot fastener axis (252) is parallel to, though not co-planar with both the first frame member second cross member (9) and the second frame member first cross member (24).

In the preferred embodiment of the frame, as per FIGS. 32, 33, and 34, the frame second pivot area is a hole having a bore passing through the first frame member second arched side arc shaped mid-body (15), the hole passing through both the first frame member second arched side outboard surface (257) and the first frame member second arched side inboard surface (258), and an aligned hole passing completely through the second frame member second arched side arc shaped mid-body (30), the hole passing through both the second frame member second arched side outboard surface (259) and the second frame member second arched side inboard surface (260). When fully assembled, a frame pivot fastener (251) may be passed through the first frame member second arched side arc shaped mid-body (15) and the second frame member first arched side arc shaped mid-body (30) such that the frame pivot fastener axis (252) is parallel to, though not co-planar with both the first frame member second cross member (9) and the second frame member first cross member (24). Furthermore, when fully assembled the frame pivot fastener axis (252) passes axially through both the frame pivot fastener (251) located at the frame first pivot area (4) and the frame pivot fastener (251) located at the frame second pivot area (5). In the preferred embodiment, the frame pivot fastener is nut and bolt, preferably a bolt having a shoulder.

As per FIGS. 1, 19, 20, 21 and 23, the instant invention further has a first payload carrier (143) which serves both as a means for portaging (carrying) articles, and as a first means for temporarily connecting the first frame member (2) to the second frame member (3). The first payload carrier (143) is essentially "U" shaped in form and has at least one first payload carrier cross member (144). In the preferred embodiment, Applicant includes two first payload cross members in order to increase the stability and strength of the first payload carrier. The first payload carrier is attached to the first frame member via first payload carrier rotatable attachment means.

As per FIGS. 19 and 20, the first payload carrier (143) may be further described as being composed of a first payload carrier first support (145), a first payload carrier second support (149), the first payload carrier second support being parallel to and co-planar with the first payload carrier first support, and a first payload carrier cross support (150), the first payload carrier cross support being perpendicular to and co-planar with both the first payload carrier first support and the first payload carrier second support.

The first payload carrier first support (145) may be further described as having a first end (146) and an opposite second end (147). The first payload carrier first support is essentially linear in form. As was noted above, the first payload carrier is rotatably attached to the first frame member via rotatable attachment means. The first payload carrier rotatable attachment means are comprised of a first payload carrier first support first rotational attachment means (148) and a first payload carrier second support rotational attachment means (153).

The first payload carrier first support has the first support rotational attachment means (148) extending from the first payload carrier first support first end (146), the first payload carrier first support rotational attachment means being the means for attaching the first payload carrier to the cross member base (38) such that the first payload carrier may rotate about the cross member base (38). Applicant prefers to accomplish this rotational attachment by bending the first payload carrier first support first end (146) completely around the cross member base, thus providing for a positive attachment which still permits rotational motion of the first payload carrier (143) as per FIGS. 1, 19 and 20.

The first payload carrier second support (149) may be further described as having a first end (151) and an opposite second end (152). The first payload carrier second support is essentially linear in form. The first payload carrier second support further has the second support rotational attachment means (153) being attached to the first payload carrier second support first end (151), the first payload carrier second support rotational attachment means extending from the first payload carrier second support first end (151), the first payload carrier second support rotational attachment means being the means for attaching the first payload carrier to the cross member base (38) such that the first payload carrier may rotate about the cross member base (38). Applicant prefers to accomplish this rotational attachment by bending the first payload carrier second support first end (151) around the cross member base, thus providing for a positive attachment which still permits rotational motion of the first payload carrier (143) in the same manner as does the first support rotational attachment means (148).

The first payload carrier cross support (150) may be further described as having a first end (154) and an opposite second end (155). The first payload carrier cross support is essentially linear in form. The first payload carrier cross support first end (154) is attached to the first payload carrier first support second end (147), while the first payload carrier cross support second end (155) is attached to the first payload carrier second support second end (152) such that the first payload carrier cross support (150) is perpendicular to, and co-planar with, both the first payload carrier first support (145) and the first payload carrier second support (149). Furthermore, the first payload carrier cross support is parallel to and co-planar with, both the first payload carrier first support rotational attachment means(148) and the first payload carrier second support rotational attachment means (153).

It should be clear now that the two parallel "legs" of the "U" shape form described earlier are formed by the first payload carrier first support and the first payload carrier second support while the perpendicular connection between the two legs is formed by the first payload carrier cross support. The first payload carrier first support, second support and cross support may be attached to one another by welding individual pieces of, for example, solid steel rods having a diameter of ¼ of one inch, however, Applicant prefers to use a single length of ¼ inch solid steel rod which is then bent into the essentially "U" shape form. Applicant further believe that it is possible to construct the first payload carrier utilizing solid aluminum rods having a diameter of 5/16 of one inch. However, other materials and dimensions may be used so long as the first payload carrier is not deformed, bent or broken when laden with a payload.

As per FIGS. 1, 19, 21 and 22, the first payload carrier further has a first payload carrier second frame member engagement means (160), the first payload carrier second frame member engagement means being similar in form to the first payload carrier cross member (144). However, where the first payload carrier cross member simply connected the first payload carrier first support (145) to the first payload carrier second support (149), and extended no farther than the first payload carrier first support (145) and the first payload carrier second support (149), the first payload carrier second frame member engagement means serves to both tie the first payload carrier first support to the first payload carrier second support and to removably and temporarily attach the first payload carrier to the second frame member (3).

As per FIGS. 19 and 21, the first payload carrier second frame member engagement means is removably attached to the second frame member (3) via second frame member receiving means. In the preferred embodiment, the second frame member receiving means is a second frame member first ferrule (161) and a second frame member second ferrule (162). The second frame member first ferrule is a steel ferrule (a hollow cylinder), the second frame member first ferrule and the second frame member second ferrule being identical to one another. The second frame member first ferrule and the second frame member second ferrule act as the receiving means for engaging the first payload carrier with the second frame member, thus assisting in stabilizing the first frame member (2) and the second frame member (3) relative to one another, once completely assembled. The second frame member first ferrule is attached to the second frame member at approximately a midpoint between the frame first pivot area (4) and the second frame member first arched side first end (25). The second frame member second ferule is attached to the second frame member at approximately a midpoint between the frame second pivot area (5) and the second frame member second arched side first end (28). In the preferred embodiment Applicant attaches the second frame member first ferrule and the second frame member first ferrule by welding them to the second frame member. As per FIG. 22, the second frame member first ferrule has a length (167) of approximately one inch, an inner diameter (168) of approximately ¼ of one inch and an outer diameter (169) of approximately ⅜ of one inch. The second frame member first ferrule and the second frame member second ferrule have the same length, inner diameter and outer diameter in the preferred embodiment.

As per FIGS. 19 and 21, the first payload carrier second frame member engagement means (160) has a first payload carrier second frame member engagement means first end (163) and an opposite first payload carrier second frame member engagement means second end (164). The first payload carrier second frame member engagement means further has, attached to, and depending downwardly from, the first payload carrier second frame member engagement means first end (163) a first payload carrier second frame member engagement means first insertion rod (165). The first payload carrier second frame member engagement means further has, attached to, and depending downwardly from, the first payload carrier second frame member engagement means second end (164) a first payload carrier second frame member engagement means second insertion rod (166). The first payload carrier second frame member engagement means first insertion rod (165) and the first payload carrier second frame member engagement means second insertion rod (166) are both perpendicular to the first payload carrier first support (145) and the first payload carrier cross member (144).

As per FIGS. 1 and 19, 21 and 22, assembly of the instant invention includes inserting the first payload carrier second frame member engagement means first insertion rod (165) into the second frame member first ferrule (161) and inserting the first payload carrier second frame member engagement means second insertion rod (166) into the second frame member second ferrule, thus securing the lower portion of the first frame member (2) to the lower portion of the second frame member (3). Clearly, the second frame member first ferrule and the second frame member second ferrule must each have an diameter sufficient to tightly accept the insertion therein of the first payload carrier second frame member engagement means first insertion rod and the first payload carrier second frame member engagement means second insertion rod. In the preferred embodiment of the instant invention, as was noted above, the first payload carrier is oriented such that it is parallel to the level surface upon which it may be placed and parallel to a first horizontal plane (158). Applicant further ensures this level orientation by attaching the second frame member first ferrule and the second frame member second ferrule to the second frame member such that when the instant invention is completely assembled and placed upon a flat, level surface, the first payload carrier is also flat and level. When so assembled, the second frame member first ferrule and the second frame member second ferrule are both transaxially bisected (radially) by the first horizontal plane. In the preferred embodiment, the distance between a longitudinal axis of the second frame member first ferrule and a longitudinal axis of the second frame member second ferrule is approximately 17 and ¾ inches. Clearly, should a foldable frame (1) having greater or lesser overall dimensions be desired, the distance between the longitudinal axis of the second frame member first ferrule and the longitudinal axis of the second frame member second ferrule would be varied proportionally. Furthermore, the precise dimensions of the second frame member first ferrule and the second frame member second ferrule may be varied so long as their inner diameter (168) remains sized to snugly accept the first payload carrier second frame member engagement means first insertion rod (165) and the first payload carrier second frame member engagement means second insertion rod (166). Obviously, should the diameter of the first payload carrier second frame member engagement means (160) be varied, the inner diameter of the second frame member first ferrule and the second frame member second ferrule will need to be varied proportionally.

As per FIG. 23, Applicant has found the first payload carrier to be especially useful for portaging various articles to be transported (243). Applicant strongly recommends lashing the articles to be transported down to the first payload carrier utilizing rope, cord, elastic cords or other lashing means, and tying the lashing means onto the first frame member second cross member (9), over the articles to be transported (243) and onto the first payload carrier cross support (150), thus securing the articles to be transported to the instant invention. Applicant has also learned that the mass of the various articles to be transported (243), when located on the first payload carrier, further insures that the first payload carrier second frame member engagement means first insertion rod (165) and the the first payload carrier second frame member engagement means second insertion rod (166) remain firmly inserted within the second frame member first ferrule (161) and the second frame member second ferrule (162) respectively.

The instant invention further includes a second payload carrier (170) pivotably attached to the first frame member (2). As per FIGS. 1 and 24, the second payload carrier is essentially a "U" shaped frame with a pair of "L" shaped supports. The second payload carrier may be further described as having a second payload carrier first rod member (171) the first rod member having a first end (172)

and an opposite second end (173), the first rod member being essentially linear in form. The second payload carrier further has a second payload carrier second rod member (174), the second rod member having a first end (175) and a second end (176), the second payload carrier second rod member being essentially linear in form, and being parallel to and co-planar with the second payload carrier first rod member. The second payload carrier further has a second payload carrier third rod member (177), the third rod member being essentially linear in form and having a third rod member first end (178) and an opposite third rod member second end (179), the third rod member being perpendicular to and co-planar with the first rod member (171) and the second rod member (174).

The second payload carrier first rod member second end (173) is attached to the second payload carrier third rod member first end (178). The second payload carrier third rod member second end (179) is attached to the second payload carrier second rod member second end (176). Thus, it should be clear that the essentially "U" shaped form of the second payload carrier is created by the attachment and orientation of the first rod member, second rod member and third rod member with the first rod member and the second rod member forming the two parallel legs of the "U".

As was noted above, and as per FIG. 24, the second payload carrier further has a pair of "L" shaped supports, the supports being a second payload carrier first support member (182) having a first support member first end (184) and an opposite first support member second end (185), the first support member second end being attached to the first rod member first end (172) such that the first support member is perpendicular to both the second payload carrier first rod member (171) and the second payload carrier third rod member (177), and a second payload carrier second support member (183) having a second support member first end (186) and an opposite second support member second end (187), the second support member second end being attached to the second rod member first end (175) such that the second support member is perpendicular to both the second payload carrier second rod member (174) and the second payload carrier third rod member (177), as well as parallel to the second payload carrier first support member (182).

As was noted above, the second payload carrier is pivotably attached to the first frame member via pivotable attachment means. In the preferred embodiment, the pivotable attachment means is a second payload carrier first insertion rod (188) and a second payload carrier second insertion rod (191).

The second payload carrier first insertion rod (188), has a first end (189) and an opposite second end (190). The second payload carrier second insertion rod (191) also has a first end (192) and an opposite second end (193). The first insertion rod first end (189) is attached to the second payload carrier first support member first end such that the first insertion rod is perpendicular to both the second payload carrier first support member (182) and the second payload carrier first rod member (171), and is parallel to, though not co-planar with, the second payload carrier third rod member (177). The second insertion rod first end (192) is attached to the second payload carrier second support member first end (186) such that the second insertion rod is perpendicular to both the second payload carrier second support member (183) and the second payload carrier second rod member (174), and is also parallel to, though not co-planar with, the second payload carrier third rod member (177). The "L" shaped supports are mirror images of one another, and have identical dimensions.

In the preferred embodiment, as per FIG. 24, the second payload carrier first rod member (171) has a length (180) of approximately 12 and ¾ inches, the second payload carrier third rod member (177) has a length (181) of approximately 17 inches, the second payload carrier second rod member (174) has a length equal to the length of the first rod member, the second payload carrier first support member (182) has a length (194) of approximately 8 and ¼ inches, the second payload carrier second support member (183) has a length equal to the length of the first support member, the second payload carrier first insertion rod (188) has a length (195) of approximately 2 and ⅛ inches and the second payload carrier second insertion rod (191) has a length equal to the length of the first insertion rod. The distance (196) between the inboard most surface of the second payload carrier first insertion rod first end (189) and the inboard most surface of the second payload carrier second insertion rod first end (192) is approximately 18 and ¼ inches. In the preferred embodiment, the second payload carrier is fabricated from the same materials, and in the same manner, as is the first payload carrier. Naturally, should a frame and its associated payload carriers be desired which has dimensions greater or lesser than those found in the preferred embodiment of Applicant's device the dimensions stated above may be varied accordingly.

It will be quickly perceived that the total length of the first insertion rod length (195) plus the second insertion rod length plus the distance (196) between the first insertion rod first end and the first insertion rod second end is approximately 22 and ½ inches while the first distance (42) between the first arched side (6) and the second arched side (7) is only approximately 18 and ½ inches. The reason for this discrepancy is that as per FIGS. 1, 2 and 26, the first frame member (2) has a first insertion rod hole (197) and a second insertion rod hole (198). In the preferred embodiment, the first insertion rod hole (197) passes through the inboard most surface of the first arched side (6), proximate to the first arched side first end (10), providing a means for inserting the first insertion rod (188) into the first arched side. The first insertion rod hole has a diameter sized for the insertion therein of the first insertion rod. Also, in the preferred embodiment, the first frame member (2) has a second insertion rod hole (198). In the preferred embodiment, the second insertion rod hole (198) passes through the inboard most surface of the second arched side (7), proximate to the second arched side first end (13), providing a means for inserting the second insertion rod (191) into the second arched side. The second insertion rod hole has a diameter equal to the diameter of the first insertion rod hole. Furthermore, as per FIG. 26, in the preferred embodiment the first insertion rod hole (197) is at a distance (199) of approximately 3 and ⅝ inches from the first arched side first end (10), and the second insertion rod hole is at a distance of 3 and ⅝ inches from the second arched side first end (13). Applicant believes that these dimensions are ideal for his invention. However, it should be recognized that they may be easily varied in order to achieve a cart which is larger or smaller, taller or shorter, wider or narrower. So long as the payload carriers carry the payload directly over the roller assembly when the device is in use, the precise dimensions are a simple matter of design choice.

Finally, as per FIGS. 24, 27 and 29, the second payload carrier (170) has frame stabilizing means for providing additional stability to the assembled foldable frame (1) and providing a removable attachment of the second payload carrier to the second frame member (3). In the preferred embodiment, the frame stabilizing means is a first wedging means (200) and a second wedging means (201) attached to the second payload carrier third rod member (177). In the preferred embodiment, the first wedging means and the second wedging means are constructed from the same material as is the second payload carrier. The first wedging means (200) is an essentially "L" shaped rod having a first wedging means first half (202) and a first wedging means second half (203), the first half being at a right angle to the second half. The first wedging means is further attached to the third rod member such that there is a first space (204) of approximately 5/16 of one inch between the forward most facing surface of the third rod member (177) and the rearward most facing surface of the first wedging means second half, the first wedging means second half depending downwardly from the first wedging means first half, perpendicularly to the third rod member (177) and the first rod member (171). In the preferred embodiment, the first wedging means is welded to the second payload carrier third rod member. The second wedging means (201) is also attached to the third rod member in the same manner in which the first wedging means is connected to the third rod member, the second wedging means being identical in form, dimensions and construction to the first wedging means. Furthermore, in the preferred embodiment the first wedging means (200) is attached to the third rod member at a distance of approximately 2 inches from the third rod member first end (178) and the second wedging means (201) is attached to the third rod member at a distance of approximately 2 inches from the third rod member second end (179).

As per FIGS. 1, 25, 28 and 29, in the preferred embodiment the instant invention further has a third payload carrier (205). The third payload carrier is, in essence, a combination of the same forms used in the second payload carrier. The third payload carrier has a third payload carrier first support member (206), the third payload carrier first support member being identical in form to the second payload carrier first support member and having a first end (207) and an opposite second end (208), the first end (207) having attached thereto a third payload carrier first insertion rod (209), the first insertion rod (209) having a first end (210) and an opposite second end (211), the third payload carrier first insertion rod being perpendicular to and co-planar with, the third payload carrier first support member, the third payload carrier first insertion rod first end (210) being attached to the third payload carrier first support member first end (207).

The third payload carrier also has a third payload carrier second support member (212), the third payload carrier second support member being identical in form to the second payload carrier second support member and having a first end (213) and an opposite second end (214), the first end (213) having attached thereto a third payload carrier second insertion rod (215), the second insertion rod (215) having a first end (216) and an opposite second end (217), the third payload carrier second insertion rod being perpendicular to and co-planar with, the third payload carrier second support member, the third payload carrier second insertion rod first end (216) being attached to the third payload carrier second support member first end (213).

The third payload carrier may be further described as having a third payload carrier first rod member (218) the first rod member having a first end (219) and an opposite second end (220), the first rod member being essentially linear in form. The third payload carrier further has a third payload carrier second rod member (221), the second rod member having a first end (222) and an opposite second end (223), the third payload carrier second rod member being essentially linear in form, and being parallel to and co-planar with the third payload carrier first rod member. The third payload carrier further has a third payload carrier third rod member (224), the third rod member being essentially linear in form and having a third rod member first end (225) and an opposite third rod member second end (226), the third rod member being perpendicular to and co-planar with the first rod member (218) and the second rod member (221).

The third payload carrier first rod member second end (220) is attached to the third payload carrier third rod member first end (225). The third payload carrier third rod member second end (226) is attached to the third payload carrier second rod member second end (223).

Furthermore, the third payload carrier has a third payload carrier first connecting rod (227), the first connecting rod having a first connecting rod first end (228) and an opposite first connecting rod second end (229), the first connecting rod second end being attached to the third payload carrier first rod member first end (219) and the first connecting rod first end (228) being attached to the third payload carrier first support member second end (208). When fully assembled, the first connecting rod (227) is parallel to and co-planar with the third payload carrier first insertion rod (209) and perpendicular to and co-planar with the third payload carrier first rod member (218) and the third payload carrier first support member (206).

Finally, the third payload carrier has a third payload carrier second connecting rod (230), the second connecting rod having a second connecting rod first end (231) and an opposite second connecting rod second end (232), the second connecting rod first end (231) being attached to the third payload carrier second rod member first end (222) and the second connecting rod second end (232) being attached to the third payload carrier second support member second end (214). When fully assembled, the second connecting rod (230) is parallel to and co-planar with the third payload carrier second insertion rod (215) and perpendicular to and co-planar with the third payload carrier second rod member (221) and the third payload carrier second support member (212).

In the preferred embodiment, as per FIG. 25, the third payload carrier second rod member (221) has a length (233) of approximately 6 and 3/4 inches, the third payload carrier third rod member (224) has a length (234) of approximately 10 and 3/4 inches, the third payload carrier first rod member (218) has a length equal to the length of the second rod member (221), the third payload carrier first support member (206) has a length (235) of approximately 2 and 3/4 inches, the third payload carrier second support member (212) has a length equal to the length of the first support member, the third payload carrier first insertion rod (209) has a length (236) of approximately 1 inch and the third payload carrier second insertion rod (215) has a length equal to the length of the first insertion rod (209). The first connecting rod (227) has a length (237) of approximately 3 and 1/2 inches and the second connecting rod (230) is equal in length to the first connecting rod.

Furthermore, in the preferred embodiment the distance (238) between the inboard most surface of the third payload carrier first insertion rod first end (210) and the inboard most surface of the third payload carrier second insertion rod first end (216) is approximately 17 and 1/8 inches. The distance (239) between the inboard most surface of the third payload carrier first connecting rod second end (229) and the inboard most surface of the third payload carrier second connecting rod first end (231) is approximately 10 and 1/2 inches. In the preferred embodiment, the third payload carrier is fabricated from the same materials, and in the same manner, as is the first payload carrier and the second payload carrier.

It will be quickly perceived that as with the second payload carrier, the total length of the third payload carrier first insertion rod length (236) plus the third payload carrier second insertion rod length plus the distance (238) between the third payload carrier first insertion rod first end and the third payload carrier first insertion rod second end is approximately 19 and ⅛ inches while the third distance (44) between the inboard most surface of the second frame member first arched side (22) and the inboard most surface of the second frame member second arched side (23) is only approximately 18 inches. The reason for this discrepancy is that as per FIGS. 1, 3 and 28, the second frame member (3) has a second frame member first insertion rod hole (240) and a second frame member second insertion rod hole (241). In the preferred embodiment, the first insertion rod hole (240) passes through the inboard most surface of the second frame member second cross member first end (35), proximate to the second frame member first arched side second end (26), providing a means for inserting the third payload carrier first insertion rod (209) into the second frame member. The second frame member first insertion rod hole has a diameter sized for the insertion therein of the third payload carrier first insertion rod. Also, in the preferred embodiment, the second frame member (3) has the second insertion rod hole (241). In the preferred embodiment, the second insertion rod hole (241) passes through the inboard most surface of the second frame member second cross member second end (36), proximate to the second frame member second arched side second end (29), providing a means for inserting the third payload carrier second insertion rod (215) into the second frame member. The second insertion rod hole has a diameter equal to the diameter of the first insertion rod hole. Furthermore, as per FIGS. 25, 28 and 29, in the preferred embodiment when the instant invention is fully assembled, the second frame member first insertion rod hole (240) must be located proximate to second frame member second cross member first end (35) such that there is a space (242) of approximately ⅜ of one inch between the third payload carrier first connecting rod (227) and the second frame member second cross member mid-body (37). The second frame member second insertion rod hole (241) and the second frame member first insertion rod hole (240) are equal in distance from the second frame member second cross member mid-body (37).

With reference to FIGS. 1, 19, 20, 21, 24, 25, 26, 27, 28 and 29, the complete arrangement and interlocking nature of the second payload carrier (170) and the third payload carrier (205) with the first frame member (2) and second frame member (3) may now be better understood. With the first frame member (2) and second frame member (3) pivotably attached to one another, and the first payload carrier (143) attached to the first frame member and second frame member, the second payload carrier is attached to the first frame member by inserting the second payload carrier first insertion rod (188) into the first frame member first insertion rod hole (197) and inserting the second payload carrier second insertion rod (191) into the first frame member second insertion rod hole (198). Applicant has found that the simplest way to accomplish this is to grasp the second payload carrier first support member (182) and the second payload carrier second support member (183) and to apply force which urges the second payload carrier first insertion rod first end (189) toward the second payload carrier second insertion rod first end (192) momentarily, then to align the second payload carrier first insertion rod second end (190) with the first frame member first insertion rod hole (197) and the second payload carrier second insertion rod second end (193) with the first frame member second insertion rod hole (198) and release the force such that the second payload carrier first insertion rod (188) enters the first frame member first insertion rod hole (197) and the second payload carrier second insertion rod (191) enters the first frame member second insertion rod hole (198). Once in place, the second payload carrier first insertion rod (188) may freely pivot within the first frame member first insertion rod hole (197) and the second payload carrier second insertion rod (191) may freely pivot within the first frame member second insertion rod hole (198). This permits the entire second payload carrier to pivot upwardly and downwardly relative to the second frame member second cross member mid-body (37). Next, applicant pivots the second payload carrier upwardly, away from the second frame member second cross member mid-body (37) and attaches the third payload carrier (205) to the second frame member (3). Attachment of the third payload carrier is accomplished in a manner similar to the attachment of the second payload carrier, that is, through the application of force urging the third payload carrier first insertion rod first end (210) toward the third payload carrier second insertion rod first end (216) and aligning the third payload carrier first insertion rod second end (211) with the second frame member first insertion rod hole (240) and the third payload carrier second insertion rod second end (217) with the second frame member second insertion rod hole (241). The force is then released, permitting the third payload carrier first insertion rod (209) to enter the second frame member first insertion rod hole (240) and the third payload carrier second insertion rod (215) to enter the second frame member second insertion rod hole (241). The third payload carrier (205) being pivotably attached to the second frame member (3), it is then possible to release the third payload carrier (205) and permit it to rest with the third payload carrier first rod (218) and the third payload carrier second rod (221) in direct contact with and atop the second frame member second cross member mid-body (37).

Finally, the second payload carrier (170) is pivoted downwardly such that the second payload carrier first wedging means (200) and the second payload carrier second wedging means (201) come into contact with the third payload carrier first connecting rod (227) and the third payload carrier second connecting rod (230), respectively. The user of the instant invention completes the assembly of the second payload carrier and third payload carrier by applying force downwardly, against the second payload carrier first wedging means (200) and the second payload carrier first wedging means (201), thereby wedging the second payload carrier first wedging means (200) between the third payload carrier first connecting rod (227) proximate to the third payload carrier first connecting rod second end (229) and the second frame member second cross member mid-body (37). So too, the second payload carrier first wedging means (201) is wedged between the third payload carrier second connecting rod (230) proximate to the third payload carrier second connecting rod first end (231) and the second frame member second cross member mid-body (37). Once the second payload carrier first wedging means (200) and the second payload carrier second wedging means (201) have been so wedged, the second payload carrier (170) and the third payload carrier (205) act as a stable connection between the first frame member (2) and the second frame member (3) as well as providing areas suitable for carrying payloads.

Once again, it should be recognized that the measurements given reflect only the dimensions found in the preferred embodiment, and it is entirely possible to vary these measurements to suit the needs of the user so long as the second frame member (3) may be pivotably attached to and pivot relative to the first frame member (2) and thus permit folding, that is, rotational scissors folding of the foldable frame (1) into a nearly flattened configuration as well as opened into its at use configuration, so long as the second payload carrier (170) fits between and may be pivotably connected to the first frame member first arched side (6) and the first frame member second arched side (7), the second payload carrier third rod member length (181) is less than the distance (238) between the third payload carrier first insertion rod first end and the third payload carrier first insertion rod second end, the third payload carrier first support member first end (207) and the third payload carrier second support member first end (213) fits between the second frame member second cross member first end (35) and the second frame member second cross member second end (36) respectively with the third payload carrier being pivotably connected to the second frame member (3), the third payload carrier second rod member length (233) is of sufficient length so that the third payload carrier first rod member (218) and the third payload carrier second rod member (221) rest upon the second frame member second cross member mid-body (37), the second payload carrier first wedging means (200) extends over and is in contact with the third payload carrier first connecting rod (227), the second payload carrier second wedging means (201) extends over and is in contact with the third payload carrier second connecting rod (230), the first payload carrier first support (145) and the first payload carrier second support (149) fit between the second frame member first arched side (22) and the second frame member second arched side (23) as well as the first frame member first arched side (6) and the first frame member second arched side (7), the first payload carrier first support (145) and the first payload carrier second support (149) have sufficient length so as to permit the rotational attachment of the first payload carrier (143) to the first frame member second cross member base (38) and releasable attachment of the first payload carrier second frame member engagement means (160) to the second frame member first arched side (22) and the second frame member second arched side (23).

Once fully assembled, the first payload carrier (143) may have articles to be transported placed upon it. The second payload carrier (170) has been found most useful when used in conjunction with a container such as a basket or sack, as per FIG. 23, though a box would work equally well. The container should have at least four connectors which permit the container (245) to be attached to the frame. In the preferred embodiment, a sack having eight ties (two per corner) is utilized. The two ties in each corner are wrapped around and tied to one another. Applicant prefers to wrap a first and second tie around the second frame member first support member proximate to the second frame member first support member second end (185), a third and fourth tie around the second frame member second support member proximate to the second frame member second support member second end (187), a fifth and sixth tie around the second payload carrier first rod member proximate to the second payload carrier first rod member second end (173) and a seventh and eighth tie around the second payload carrier second rod member proximate to the second payload carrier second rod member second end (176). Obviously, other methods may be utilized to attach the carrier to the frame including, but not limited to straps having buckles, straps having male and female connectors, and straps or lines having hook and loop pads.

Applicant has found that the third payload carrier is especially useful for stabilizing longer articles like snow skis and fishing poles. For example, after emplacing various articles to be transported (243) to be carried on the first payload carrier, one may thread a snow ski pole or snow ski (244) between the second frame member second cross member mid-body (37) and the third payload carrier third rod member (224), allowing the bottom of the pole or ski to set on the gear which is being carrier while the remainder of the pole or ski extends upwardly and is stabilized by the third payload carrier.

While the frame stabilizing means in the preferred embodiment is the first wedging means and the second wedging means, in another embodiment, as per FIGS. 35 and 36, the frame stabilizing means is similar to the first payload carrier second frame member engagement means. That is, instead of having the first wedging means (200) and the second wedging means (201) attached to the second payload carrier third rod member (177), the first wedging means (200) first half may be attached to the second payload carrier first rod member (171) proximate to the second payload carrier first rod member second end (173) and the second wedging means first half may be attached to the second payload carrier second rod member (174), proximate to the second payload carrier second rod member second end (176). Applicant then permanently attaches a second frame member third ferrule (261) to the second frame member first arched side (22), proximate to the first arched side second end (26). Applicant further permanently attaches a second frame member fourth ferrule (262) to the second frame member second arched side (23), proximate to the second arched side second end (29). The second frame member third ferrule (261) and the second frame member fourth ferrule (262) are identical in form to the second frame member first ferrule (161). In this embodiment of the instant invention, stabilization of the first frame member (2) to the second frame member (3) is accomplished by inserting the first wedging means second half into the second frame member third ferrule (261) and the second wedging means second half (262) into the second frame member fourth ferrule. This is accomplished in exactly the same manner as was described for inserting the first payload carrier second frame member engagement means first insertion rod (165) into the second frame member first ferrule (161). Furthermore, in this embodiment of the instant invention, the third payload carrier is not attached to the second frame member (3) or utilized in any fashion. In both this embodiment, and in the preferred embodiment, when the beach cart is fully assembled, the first payload carrier first support (145) and the first payload carrier second support (149) are parallel to, though not co-planar with, the second payload carrier first rod member (171) and the second payload carrier second rod member (174). Additionally, the second payload carrier first rod member (171) and the second payload carrier second rod member (174) are parallel to, though not co-planar with, the first horizontal plane (158).

As per FIGS. 1, 5, and 6, the first frame member (2) has attached thereto a first wheel riser (46). The first wheel riser has a first end (47) and a second end (48). The first wheel riser (46) being attached to the first frame member second cross member first leg (39). In the preferred embodiment, this attachment is accomplished by welding the first wheel riser first end (47) to the first frame member second cross member first leg (39) at about the midpoint between where the first frame member second cross member first leg connects to the cross member base (38) and where the first frame member second cross member first leg connects to the first arched side second end (11). Furthermore, in the preferred embodiment, the first wheel riser (46) is attached to the underside of the second cross member first leg (39), that is, the side of the cross member first leg most distal from the first cross member (8). It should be understood, however, that the first wheel riser could be attached to the side of the cross member first leg (39) which is most distal from the cross member second leg (40).

The first wheel riser (46) further has a first wheel mounting block attachment means. In the preferred embodiment, the first wheel mounting block attachment means is a first wheel riser hole (53) and a first wheel riser second hole (116) passing through the first wheel riser second end (48), the axis of the first wheel riser hole and the second wheel riser hole being perpendicular to the cross member first leg (39), the first wheel riser hole and the second wheel riser hole each having coaxially associated therewith a weld-nut. The combination weld-nuts and first wheel riser hole/second wheel riser hole provide a means for securing a wheel mounting block to the wheel riser, as described below. While Applicant prefers to use the hole/weld-nut (the weld-nut being a threaded nut having a circumferential flange which is welded permanently in place on the wheel riser directly above its associated hole passing through the wheel riser), it is possible to utilize other attachment means so long as the wheel mounting block may be firmly, but removably, secured to the wheel riser.

While the first wheel riser may be constructed from a solid "slab", Applicant believes that this would add unnecessary weight to the instant invention. Therefore, as per FIG. 6, in the preferred embodiment the first wheel riser (46) is constructed as a modified beam shaped (that is, appearing as a transaxially cross-sectioned "I" beam would) wherein a first wheel riser vertical section (49) is perpendicular to a first wheel riser first horizontal section (50) and a first wheel riser second horizontal section (51). The first wheel riser first horizontal section (50) and the first wheel riser second horizontal section (51) being parallel to, though not co-planar with, one another. Obviously, the first wheel mounting block first horizontal section and the first wheel mounting block second horizontal section are both attached the first wheel mounting block first vertical section.

As with other typical "I" beam constructions, the first wheel riser has a first wheel riser second vertical section (52), the second vertical section being perpendicular to the first wheel riser first horizontal section (50) and the first wheel riser second horizontal section (51) and attached, perpendicularly, along its entire length to the first wheel riser first vertical section (49). The first wheel riser second vertical section is further attached to both the first wheel riser first horizontal section and the first wheel riser second horizontal section. When configured in this manner, the first wheel riser second horizontal section (51) has the first wheel riser first hole (53) and the first wheel riser second hole (116) passing completely therethrough, the first wheel riser first hole and the first wheel riser second hole being separated from one another by the first wheel riser second vertical section (52). In the preferred embodiment, the distance between the first wheel riser first horizontal section (50) and the first wheel riser second horizontal section (51) is 2 and ¾ inches. However, Applicant notes that by increasing this distance, it is possible to use a wheel having a greater diameter and circumference. Such a modification may be especially useful when adapting the instant invention to travel extremely loose soils while carrying much heavier loads.

As per FIG. 1, the instant invention further has a second wheel riser. The second wheel riser is constructed identically to the first wheel riser, and has identical wheel mounting block attachment means. However, where the first wheel riser is attached to the first frame member second cross member first leg (39), the second wheel riser is attached to the first frame member second cross member second leg (40). The first wheel riser and the second wheel riser are constructed of the same materials and have the same dimensions as one another.

As per FIGS. 1, 5, 7, 8, 9 and 15, the instant invention further has the first wheel mounting block (54). In the preferred embodiment, the first wheel mounting block is an essentially rectangular block having a first side (60), a second side (61), a third side (62), a fourth side (63) a fifth side (64) and a sixth side (65). The first side (60) and the third side (62) are parallel to, though not co-planar with, one another. The second side (61) and the fourth side (63) are parallel to, though not co-planar with, one another. The fifth side (64) and the sixth side (65) are parallel to, though not co-planar with, one another. The first side (60) is attached to the second side (61), the fifth side (64), the sixth side (65) and the fourth side (63). The second side (61) is attached to the first side (60) the third side (62) the fifth side (64) and the sixth side (65). The third side (62) is attached to the second side (61) the fifth side (64) the sixth side (65) and the fourth side (63). The fourth side (63) is attached to the third side (62) the fifth side (64), the sixth side (65) and the first side (60).

In the preferred embodiment, as per FIGS. 7, 8 and 9, a width (55) of the first wheel mounting block is greater than a height (56) of the first wheel mounting block, and the height is greater than a thickness (57) of the first wheel mounting block. However, Applicant believes that the first wheel mounting block height (56) and the first wheel mounting block width (55) could be equal to one another or could have their relative dimensions reversed. In the preferred embodiment, the first wheel mounting block width (55) is approximately 2 and ⅞ inches, the first wheel mounting block height (56) is approximately 2 and ⅜ inches and the first wheel mounting block thickness (57) is approximately ¾ of one inch.

The first wheel mounting block (54) further has a first hollow tubular passage (58) and a second hollow tubular passage (59) passing completely therethrough. A second hollow tubular passage axis (119) and a first hollow tubular passage axis are parallel to and co-planar with one another. Furthermore, the axis of the first hollow tubular passage and the second hollow tubular passage are parallel to, though not co-planar with, the first side (60), the third side (62), the fifth side (64) and the sixth side (65) and are perpendicular to the second side (61) and the fourth side (63) such that the first hollow tubular passage has an opening passing through the second side (61) and the fourth side (63), as does the second hollow tubular passage.

As per FIGS. 7, 8, and 9, a diameter (118) of the second hollow tubular passage (59) and the first hollow tubular passage (58) is larger than the diameter of a first attachment means (117) such that the first attachment means may pass completely through the hollow tubular passage, the first hollow tubular passage having a diameter equal to the second hollow tubular passage diameter, the diameter further being at a right angle to the second hollow tubular passage axis (119). In the preferred embodiment, Applicant utilizes the first attachment means (117) as well as a second attachment means, a third attachment means and a fourth attachment means, the second attachment means, third attachment means and fourth attachment means all being identical in every respect to the first attachment means.

Applicant further believes it is desirable to fashion the first wheel mounting block from a substantially rigid, but lightweight material. In the preferred embodiment, this is accomplished by utilizing a high density polyethylene plastic block which is molded to provide the desired dimensions and features. However, other materials (for example an aluminum block which is then machined to provide the desired dimensions and features) may be utilized instead.

However, when constructed of a material such as high density polyethylene plastic, Applicant has found that it is also desirable to line the hollow tubular passages with a different material which will be better able to withstand the stresses and wear caused by the passage therethrough of the wheel mounting block attachment means. Therefore, Applicant believes it is desirable to include a bushing or metal sleeve within the hollow tubular passages. The metal sleeve should be fashioned from a hard and strong material such as steel, aluminum or brass and be as long as the hollow tubular passage itself Applicant prefers to use aluminum alloyed with 1% magnesium and 0.6% silicon, the alloy having a tensile strength range of 20,000 to 40,000 psi. for the metal sleeve or bushing.

However, it must be remembered that the diameter of the hollow tubular passages should be such that the wheel mounting block attachment means may pass through the wheel mounting block. Therefore, Applicant suggests fashioning the hollow tubular passages such that their diameter is sufficiently large enough that when the metal sleeve is fixedly inserted into the hollow tubular passage, the diameter of the sleeved hollow tubular passage is still large enough to accommodate the passage therethrough of the first attachment means (117). In the preferred embodiment, the first attachment means is a threaded bolt.

As per FIGS. 7, 8, and 9, the first wheel mounting block (54) further includes a recessed area for insertion therein of a friction reduction means and an axle stub. The recessed area is composed of a first hole (66) passing through the fifth surface (64), the first hole having a first bore (67), the first bore extending into the first wheel mounting block, though not entirely through the first wheel mounting block, so that the first bore (67) has a first bore floor (68). A distance between the first bore floor (68) and the first bore hole (66) located on the fifth side (64) may be described as a first bore depth (263). A diameter of the first hole (66) is equal to a first bore diameter (69), the first bore diameter in the preferred embodiment being approximately 1 and ⅝ inches. A first bore axis (120) is perpendicular to the second hollow tubular passage axis (119). Additionally, the surface texture of the wheel mounting block first bore (67) should be roughened, the surface texture of the wheel mounting block first bore (67) in the preferred embodiment being roughened through surface etching or other similar means. Other surface textures could be used, such as cross hatching, of said surface, or sanding said surface to produce a rough surface texture. The manner in which the roughening of said surface is accomplished is unimportant, so long as said surface is not smooth.

As per FIGS. 7, 8 and 9, the first wheel mounting block further has a first ejection means which passes radially through the first wheel mounting block bore, parallel to the second hollow tubular passage axis (119). In the preferred embodiment, the first ejectment means is a first surface hole (90) passing through the fourth side (63), a third hollow tubular passage (89) passing through the first wheel mounting block, and opening into the recessed area defined by the first bore (67) through a first bore hole (91), the first bore hole passing through the first bore (67), the first bore hole being coaxial with the third hollow tubular passage (89) and the first fourth side hole (90). Furthermore, it should be understood that the axis (121) of the third hollow tubular passage (89) is parallel to, though not co-axial with, the axis of the first tubular passage (58) and the second tubular passage (59). Finally, although only a first wheel mounting block has been described, it should be understood that the instant invention utilizes a first wheel mounting block and a second wheel mounting block (122). Just as it was noted above that the instant invention has a first wheel riser and a second wheel riser, the instant invention has the first wheel mounting block and the second wheel mounting block. The second wheel mounting block is configured identically to the first wheel mounting block. For the sake of clarity it is useful to note that in the preferred embodiment, the first wheel mounting block utilizes the first attachment means (117) and the second to removably fasten the first wheel mounting block to the first wheel riser and the second wheel mounting block utilizes the third attachment means and the third attachment means to removably fasten the second wheel mounting block to the second wheel riser.

The instant invention further has a friction reduction means which is inserted into the first wheel mounting block recessed area. The friction reduction means is useful for diminishing the friction which would be caused by rotation within the first wheel mounting block of the rotatably mounted axle stub. Applicant has found that friction reduction means such a race bearing may be utilized. However, Applicant has further learned that it is possible to utilize what Applicant calls "wear bearings" instead of race bearings, and that this wear bearing may be configured such that it embodies useful properties in addition to friction reduction.

As per FIGS. 10, 11, 12 and 15, the wear bearing (70) is composed of a wear bearing outer sleeve (71) and a wear bearing inner sleeve (72). The wear bearing outer sleeve (71) is essentially a shortened hollow cylinder having an outer sleeve outer diameter (73), greater than an outer sleeve inner diameter (74), the difference between the outer sleeve outer diameter and the outer sleeve inner diameter defining an outer sleeve thickness (123), and an outer sleeve depth (264), the outer sleeve depth being less than the outer sleeve inner diameter (74). The outer sleeve further has an outer surface (75), the outer surface being continuous, an inner surface (76), the inner surface being continuous, a wheel facing surface (80) and a wheel mounting block facing surface (81). The wheel mounting block facing surface (81) and the wheel facing surface (80) are parallel to, though not co-planar with one another. Furthermore, the inner surface (76) is attached to the wheel facing surface (80) and to the wheel mounting block facing surface (81). The outer surface (75) is also attached to the wheel facing surface (80) and the wheel mounting block facing surface (81).

The outer sleeve further has an outer sleeve first hole (77) on the outer surface and a corresponding outer sleeve second hole (78) on the inner surface, the outer sleeve first hole (77) and the outer sleeve second hole (78) being connected to one another by an outer sleeve bore (79), the outer sleeve bore passing completely through the outer sleeve (70) (that is, the outer sleeve bore length being equal to the outer sleeve thickness) such that an object inserted into the outer sleeve first hole (77) may pass through the outer sleeve outer surface (75), through the outer sleeve and out of the outer sleeve second hole (78) located on the outer sleeve inner surface (76). The combination outer sleeve first hole, outer sleeve bore and outer sleeve second hole together constituting the outer sleeve waste ejection means.

In the preferred embodiment, the outer sleeve outer surface (75) has a textured finish such as striations, hatchwork, or other texture which results in a roughened surface having a higher friction coefficient than would a smooth texture. Furthermore, in the preferred embodiment the outer sleeve is constructed from a rigid material such as nylon, though similar materials including but not limited to Teflon and Delrin could be used. The particular material is unimportant so long as the inner sleeve and outer sleeve may freely rotate against one another with as low a frictional coefficient as possible. Finally, the outer sleeve outer diameter (73) is less than the first bore diameter (69) such that the outer sleeve may be pressure fit into the first wheel mounting block and retained therein. Furthermore, in the preferred embodiment, the outer sleeve depth (264) is equal to the first wheel mounting block bore depth (263).

As per FIGS. 10, 13, 14, and 15, the wear bearing inner sleeve (72) is essentially a shortened hollow cylinder having an inner sleeve outer diameter (82), the inner sleeve outer diameter being greater than an inner sleeve inner diameter (83), the difference between the inner sleeve outer diameter and the inner sleeve inner diameter defining an inner sleeve thickness (124), and an inner sleeve depth (84) less than the inner sleeve inner diameter (83), the inner sleeve depth (84) being equal to the outer sleeve depth (264). In the preferred embodiment, the outer sleeve depth (264) is approximately ½ of one inch. The inner sleeve further has an inner sleeve outer surface (85), the inner sleeve outer surface being continuous, an inner sleeve inner surface (86), the inner sleeve inner surface being continuous, an inner sleeve wheel facing surface (87) and an inner sleeve wheel mounting block facing surface (88). The inner sleeve wheel mounting block facing surface (88) and the inner sleeve wheel facing surface (87) being parallel to, though not co-planar with one another. Furthermore, the inner sleeve inner surface (86) is attached to the inner sleeve wheel facing surface (87) and to the inner sleeve first wheel mounting block facing surface (88). The inner sleeve outer surface (85) is also attached to the inner sleeve wheel facing surface (87) and the inner sleeve first wheel block facing surface (88). It should be readily apparent that the form of the outer sleeve (71) is identical to the form of the inner sleeve (72).

In the preferred embodiment, the inner sleeve inner surface (86) has a textured finish such as striations, hatchwork, or other texture which results in a roughened surface having a higher friction coefficient than would a smooth texture. Furthermore, in the preferred embodiment the inner sleeve is constructed from the same material as is the outer sleeve.

As per FIGS. 10 and 13, the outer sleeve inner diameter (74) and the inner sleeve outer diameter (82) are sized such that the inner sleeve may be snugly inserted, co-axially, into the outer sleeve. In the preferred embodiment, the outer sleeve outer diameter (73) is approximately 1 and ⅝ inches, the outer sleeve thickness (123) is approximately ⅛ of one inch, the inner sleeve outer diameter (82) is approximately 1 and 9/16 inches and the inner sleeve thickness (124) is approximately ⅛ of one inch. However, while the inner sleeve is snugly inserted into the outer sleeve, the fit should not be so snug as to prevent the inner sleeve from freely rotating within the outer sleeve. In the preferred embodiment, the surface texture of the inner sleeve outer surface (85) and the outer sleeve inner surface (76) is smooth. As was noted above, the surface texture of the outer sleeve outer surface (75) is roughened through surface etching or other similar means. Other surface textures could be used, such as cross hatching, of said surface, or sanding said surface to produce a roughened surface texture. The manner in which the roughening of the outer sleeve outer surface is accomplished is unimportant, so long as said surface is not smooth.

Just as has been previously noted in connection with the first wheel riser and the first wheel mounting block, that the device incorporated a second wheel riser identical to the first wheel riser, and a second wheel mounting block identical to the first wheel mounting block, so too with the outer sleeve and the inner sleeve, the instant invention incorporates a second outer sleeve and a second inner sleeve identical to the outer sleeve and the inner sleeve. When fully assembled, the second inner sleeve is rotatably mounted within the second outer sleeve, and the second outer sleeve is press fit into the second wheel mounting block in the same fashion as the outer sleeve is press fit into the first wheel mounting block. It should be readily understood that where the outer sleeve and the inner sleeve were described as having first wheel mounting block facing surfaces, the second outer sleeve and the second inner sleeve instead may be described as having second wheel mounting block facing surfaces.

As per FIGS. 10, 11, 12, 13, 14 and 15, the assembled first wheel riser (46), first wheel mounting block (54) and wear bearing (70) may now be better understood. The outer sleeve (70) is press fit or inserted by hand within the first bore (67). As was noted above, in the preferred embodiment the outer sleeve outer surface (75) and the first bore (67) both have a roughened texture. Given that the outer sleeve outer diameter (73) is only slightly less than the first bore diameter (69), once the outer sleeve (70) is inserted coaxially into the first bore (67) it will tend to remain in place there. The outer sleeve (70) is further maintained in place by the contact of its roughened outer surface (75) with the roughened surface of the first wheel mounting block first bore (67). In the preferred embodiment, it is the combination of this tight fit between the outer sleeve (70) and the first bore (67) which retains the outer sleeve in the first bore when the device is in use, and further prevents the outer sleeve from rotating within the first wheel mounting block bore. Applicant suggests, however, that should undesired rotation of the outer sleeve take place within first bore, it may be useful to locate a groove or keyway on the outer sleeve outer surface, said keyway being parallel to the outer sleeve axis, and to locate a ridge or key on the wheel mounting block bore surface, the key and the keyway being sized such that when the outer sleeve is emplaced within the first bore, the key will engage the keyway and prevent the outer sleeve from rotating within the wheel mounting block bore.

It should be further noted that when the outer sleeve (70) is tightly pressed into the first bore (67), the outer sleeve bore (79) and the third hollow tubular passage (89) must be oriented such that they are aligned and coaxial. In order for the wear bearing to function properly, it is absolutely necessary that the outer sleeve bore (79) and the third hollow tubular passage (89), once assembled, remain at all times aligned and coaxial. This is necessary to ensure that particulate matter which has entered the outer sleeve bore (79) may pass unobstructed through the outer sleeve bore and through the third hollow tubular passage (89), thereby exiting the first wheel mounting block and returning to the environment outside the first wheel mounting block and the wear bearing. It is useful at this point to note that when fully assembled, the third hollow tubular passage axis (121) and the outer sleeve bore (79) may be further described as being coaxial with a first vertical axis (92). The outer sleeve should be firmly and non-rotatably seated within the first bore such that the outer sleeve wheel mounting block facing surface (81) is in direct contact with the first bore floor (68).

It is also useful to not that the first vertical axis (92) will radially bisect the frame first pivot area (4), thus clarifying the precise location of the first pivot area along the first frame member (2).

Once the outer sleeve (70) has been firmly and non-rotatably seated coaxially within the first bore, the inner sleeve (72) may be fitted into the outer sleeve (70), coaxially with the outer sleeve and the first bore (54). Once fully in place, the inner sleeve first wheel mounting block facing surface (88) is in direct contact with the first bore floor (68). The smooth outer surface (85) of the inner sleeve is in direct contact with the smooth inner surface (76) of the outer sleeve such that when the inner sleeve is rotated relative to the outer sleeve, the smooth surfaces in contact with one another allow the inner sleeve to rotate relatively freely. As was described above in connection with the wear bearing, the instant invention utilizes two friction reduction means when fully assembled. In the case where a wear bearing is chosen as the friction reduction means, there is a second set of outer sleeves and inner sleeves used. The wear bearing will be inserted into both the first wheel mounting block and the second wheel mounting block. In the case where a race bearing, or other friction reduction means is used, said friction reduction means must be assembled into both the first wheel mounting block and the second wheel mounting block. In the event that a different friction reduction means is used instead of the wear bearing, for example, a set of race bearings, one would insert the race bearing into the first wheel mounting block and into the second wheel mounting block in the same fashion as one would the wear bearing.

As per FIGS. 1, 16, 18 and 34, the instant invention further has a roller assembly (93). Roller assemblies, are fairly well known in the art, a fine example of same being disclosed in column 3 of in U.S. Pat. No. 4,362,308 by James Hicks on Dec. 7, 1982, lines 32 through 42 which is herein incorporated by reference.

Applicant's roller assembly (93) includes a cylindrical roller section (94) having a first end (95) and a second end (96), a first end cap (97) attached to the roller section first end (95) and a second end cap (98) attached to the roller section second end (96), the first end cap (97) serving as a first wheel, the second end cap (98) serving as a second wheel. In the preferred embodiment, the first end cap and second end cap are attached to the roller section, and preferably hermetically sealed utilizing heat sealing, spin welding, chemical bonding or other suitable means. As with other prior art roller assemblies, the first end cap and the second end cap each have a tire tread running circumferentially about them for better traction when moving across firm surfaces such as pavement. In the preferred embodiment, the second end cap has an outer diameter (102) greater than a cylindrical roller section outer diameter (103), and an outer diameter of the first end cap is equal to the outer diameter of the second end cap. In the preferred embodiment, the cylindrical roller section diameter is approximately 6 inches, and the outer diameter of the second end cap is approximately 8 inches. Furthermore, the first end cap (97) the cylindrical roller section (94) and the second end cap (98) are coaxial with one another and a cylindrical roller axis (131). Naturally, the cylindrical roller section (94) has a radius equal to one half of the cylindrical roller section outer diameter and the second end cap has a radius equal to one half of the second end cap outer diameter (102)

The first end cap (97) and second end cap (98) serve both as the means for supporting and rolling the beach cart, and as the means for connecting the roller section to the beach cart. These goals are accomplished by end caps each having a stub axle (99). The stub axle has a stub axle outer diameter (100) and a stub axle depth (101). The stub axle outer diameter is no greater than the inner sleeve inner diameter (83), and the stub axle depth (101) is preferably the same as the inner sleeve depth (84). The stub axle (99) further has a roughened surface texture like the roughened surface texture of the inner sleeve inner surface (86), although that portion of the stub axle which may come in contact with the wheel mounting block first bore floor (68) should be smooth.

In the preferred embodiment, the stub axles are formed integrally with the first end cap (97) and with the second end cap (98). However, the stub axles could be produced separately from the first end cap (97) and the second end cap (98), in which case the stub axles would be attached to the end caps utilizing suitable means for attachment such as chemical bonding, heat sealing, spin welding or the like. Whether produced integrally with the end cap, or separately and then attached, the stub axles (99) must be coaxial with the end caps and the roller section axis (131). In addition to supporting the instant invention, the first end cap and second end cap further serve to track the wheel direction on a normal, pitched or slanted elevation of beach topography, and in the preferred embodiment, the first end cap and the second end cap are actually wheels having circumferential treads, the tread being preferably fabricated from rubber.

The roller assembly (93) further includes a plurality of so-called wave form vanes (104) attached to the cylindrical roller section (94), the wave form vanes extending from proximate to the roller section first end (95) to proximate to the roller section second end (96), the wave form vanes being positioned on the roller assembly, radially about the roller assembly's longitudinal axis (the roller assembly's longitudinal axis and the roller section axis being one and the same). In the preferred embodiment, a total of 8 wave form vanes are evenly spaced radially about the roller section, however, any number of wave form vanes 3 or more will do.

The wave form vanes are essentially a series of ridges or vanes which provide traction when engaging soft soils such as sand, as well as providing greater traction when traversing other colloidal surfaces such as snow. As per FIGS. 16, 18, 30 and 31, the wave form vanes further each having a forward face (125), a top surface (126) and a rearward face (127), the forward face (125) and the rearward face (127) being parallel to one another, the top surface (126) being perpendicular to both the forward face and the rearward face, the forward face being attached to the roller section exterior surface and the top surface, the top surface being attached to the forward face and the rearward face, the rearward face being attached to the top surface and the roller section exterior surface.

The wave form vane may be better understood with reference to FIG. 17 wherein a line (128) has been extended from the roller section first end (95) to the roller section second end (96), the line being parallel to, though not co-planar with, the roller section axis (131), the line being located on the cylindrical roller section (94) exterior surface, the line further having a line midpoint (129). With reference to the line (128), the wave form vane may be understood as being composed of a wave form vane mid-section (113) having a wave form vane mid-section first end (132) and a wave form vane mid-section second end (133), the wave form vane mid-section extending away from the line midpoint (129), tangentially relative to the line (128) along the cylindrical roller section (94) exterior surface toward the roller section first end (95) and ending at the wave form vane mid-section first end (132). In the preferred embodiment, a wave form vane mid-section first angle (130) denoting the angular relationship of the line (128) to the wave form vane mid-section (113) is 30 degrees, however, any first angle greater than 1 degree will suffice.

The wave form vane further extends away from the line mid-point (129), tangentially relative to the line (128) along the cylindrical roller section (94) exterior surface toward the roller section second end (96) and ending at the wave form vane mid-section second end (133). In the preferred embodiment, a wave form vane mid-section second angle (134) denoting the angular relationship of the line (128) to the wave form vane mid-section (113) is 30 degrees, however, any angle greater than I degree will suffice. It should be understood that the wave form vane mid-section (113) is linear in form, the distance between the line mid-point (129) and the wave form vane mid-section first end (132) being equal to the distance between the line mid-point (129) and the wave form vane mid-section second end (133).

The wave form vane may be further understood with reference to FIG. 17 wherein a second line (135) has be extended from the roller section first end (95) to the roller section second end (96), the second line (135) being parallel to, though not co-planar with, the roller section axis (131) and the line (128), the second line also being located on the cylindrical roller section (94) exterior surface. The second line intersects the wave form vane mid-section second end (133). At the intersection of the wave form vane mid-section and the second line, a wave form vane second section (110) having a wave form vane second section first end (136) and a wave form vane second section second end (137) merges into, and becomes one with the wave form vane mid-section. The wave form vane mid-section second end (133) and the wave form vane second section first end (136) are attached to one another. In the preferred embodiment, a wave form vane second section angle (138) denoting the angular relationship of the second line (135) to the wave form vane second section (110) is 5 degrees, however, any second section angle greater than 1 degree will suffice. It should be understood that the wave form vane second section (110) is linear in form. Furthermore, in the preferred embodiment, the wave form vane second section second end (137) terminates at a distance of 1 inch from the second end cap (98). This distance is not critically important so long as there is sufficient space between the wave form vane second section second end and the second end cap so that the colloidal materials being moved along the wave form vane as the roller assembly rotates may pass between the wave form vane and the second end cap, thus decreasing the build up of materials along the wave form vane.

The wave form vane may be further understood with reference to FIG. 17 wherein a third line (139) has be extended from the roller section first end (95) to the roller section second end (96), the third line (139) being parallel to, though not co-planar with, the roller section axis (131), the line (128), and the second line (135), the third line also being located on the cylindrical roller section (94) exterior surface. The third line intersects the wave form vane mid-section first end (132). At the intersection of the wave form vane mid-section first end and the third line, a wave form vane third section (107) having a wave form vane third section first end (140) and a wave form vane third section second end (141) merges into, and becomes one with the wave form vane mid-section. The wave form vane mid-section first end (132) and the wave form vane third section second end (141) are attached to one another. In the preferred embodiment, a wave form vane third section angle (142) denoting the angular relationship of the third line (139) to the wave form vane third section (107) is 5 degrees, however, any third section angle greater than 1 degree will suffice. It should be understood that the wave form vane third section (107) is linear in form. Furthermore, in the preferred embodiment, the wave form vane third section first end (140) terminates at a distance of 1 inch from the first end cap (97). Again, as with the wave form vane and the second end cap, this distance is not critically important so long as there is sufficient space between the wave form vane third section first end and the first end cap so that the colloidal materials being moved along the wave form vane as the roller assembly rotates may pass between the wave form vane and the first end cap, thus decreasing the build up of materials along the wave form vane.

Applicant believes that the instant invention functions most efficiently on granular surfaces when such a space between the terminating ends (the wave form vane second section second end and the wave form vane third section first end) of the wave form vanes and the end caps exists as it provides a means for colloidal materials to be ejected around the wave form vanes rather than allowing the colloidal materials to build up in front of, or behind the wave form vanes, when the roller assembly is traversing soft soils, colloidal surfaces and granular surfaces in use.

Finally, as per FIGS. 16, 18, 20 and 21, it should be understood that while the wave form vanes extend radially and outwardly from the cylindrical roller section (94), the wave form vane height (114) is such that no wave form vane extends beyond the second end cap outer diameter (102). Applicant believes this is desirable in order to prevent the wave form ridges from coming in contact with the surface being traversed when said surface is a hard surface such as cement. Applicant has learned that when the roller assembly traverses a soft soil, the first end cap and the second end cap will tend to sink into that soft soil such that the wave form vanes (104) come into direct contact with said soft soil. However, when traversing a hard soil, it is preferable that only the end caps come into contact with that hard surface. In the preferred embodiment, the wave form vane height is ½ of one inch, the wave form vane width (115) is ¾ of one inch and the wave form vanes are evenly spaced circumferentially about the cylindrical roller section (94). Applicant believes a wave form vane height of ½ of one inch is optimal, however, so long as the wave form vane does not strike the ground (that is, come into contact with the ground) while the roller assembly is traveling across a solid surface (a solid surface being one which the end caps do not settle or sink into, such as hardened concrete, for example), other heights would be acceptable. Furthermore, Applicant believes that the wave form vane width of ¾ of one inch is optimal, however other widths would work equally well so long as the width was sufficient (given the material from which the wave form vane is to be formed) to prevent the wave form vane from distorting, bending or breaking when in use.

Applicant further believes that the wave form vane third section first end (140) and the wave form vane second section second end (137) should terminate in a radiused (rounded) configuration. This may be better understood with reference to FIGS. 18, 19, 20, 35 and 36.

As per FIG. 35, the wave form vane forward face (125) and the wave form vane rearward face (127) curve toward and merge into one another at the wave form vane third section first end (140). Applicant believes it may be useful for the curving surface of the forward face (246) proximate to the roller section first end (95) to have a greater radius than the curving surface of rearward face (247) proximate to the roller section first end. Naturally, the wave form vane top surface (126) proximate to the roller section first end (95) follows the contour of the wave form vane forward face (125) and the wave form vane rearward face (127) such that the top surface which is immediately adjacent to the curved portion of the wave form vane forward face is also so curved, resulting in an essentially arc shaped form.

At the opposite end of the wave form vane, as per FIG. 36, the wave form vane rearward face (127) and the wave form vane forward face (125) curve toward and merge into one another at the wave form vane second section second end (137). Applicant believes it may be useful for the curving surface of the rearward face (248) proximate to the roller section second end (96) to have a greater radius than the curving surface of forward face (249) proximate to the roller section second end. Naturally, the wave form vane top surface (126) proximate to the roller section second end (96) follows the contour of the wave form vane forward face (125) and the wave form vane rearward face (127) such that the top surface which is immediately adjacent to the curved portion of the wave form vane forward face is also so curved, resulting in an essentially arc shaped form.

While the wave form vane disclosed in the preferred embodiment has a wave form vane forward face (125) a wave form vane rearward face (127) and a wave form vane top surface (126), it is entirely possible to do away with the wave form vane top surface and vary the surface contour of the forward face and rearward face. For example, as per FIG. 42, the wave form vane (104) may be composed solely of a forward face (125) and a rearward face (127) with no top surface (126) merely by inclining the forward face and the rearward face towards one another, giving the wave form vane a "triangular" cross section. Furthermore, as per FIG. 43, it is entirely possible to retain the top surface (126) and give it a-convex contour such that when viewed cross sectionally, the top surface is arc shaped, or appears as an inverted "U". As per FIG. 44, the top surface could be given a convex contour such that when viewed cross sectionally, the top surface appeared essentially "U" shaped. So too, the forward face (125) and/or the rearward face (127) may be contoured in a fashion like the top surface. In each case, Applicant believes that such contouring will have varying effects on the effectiveness of the wave form vane when engaging colloidal or soft materials.

The operating principals of the roller assembly having wave form vanes should now be clear. When in use, and being moved forward, the roller assembly (when viewed from the roller assembly first end) will turn in a clockwise direction (250) as per FIG. 21. When so turning, the wave form vane forward face (125) will come into contact with the colloidal material across which the roller assembly is traveling. As the wave form vane contacts the colloidal material, the wave form vane forward face (125) most proximate to the roller assembly second end (96) will begin to engage said colloidal material. As has been explained, the wave form vane second section (110) is at an angle relative to the roller section axis (131). Hence, when the roller assembly is being pushed straight forward, the colloidal materials engaging the wave form vane second section will tend to be pushed along the wave form vane forward face (125), toward the wave form vane midsection (113). As the roller assembly continues its rotation, said colloidal materials will continue to move along the wave form vane forward face (125) passing from the wave form vane second section (110) to the wave form vane mid-section (113). Applicant believes that when the wave form vane mid-section is at a greater angle relative to the (131) than is the angle of the wave form vane second section to the roller section axis (131), that said colloidal materials will gain inertial thrust as the wave form vane midsection engages them and said colloidal materials will be propelled along the wave form vane third section (107) before escaping between the wave form vane third section first end (140) and the first end cap (97).

Applicant has found that wave form vanes are far superior to conventional straight vanes, ribs or ridges in that as the roller assembly rotates while traversing colloidal surfaces, the colloidal or granular materials composing said surface which come into contact with the wave form vane tend to move along the forward face and the rearward face of the wave form vane due to the multi-angular design of the wave form vanes, the colloidal or granular materials ultimately being directed towards the spaces between the wave form vanes and the end caps. In practice, this means that when pushing a structure (such as a beach cart) equipped with Applicant's roller assembly forward, said surface materials will tend to be pushed along the wave form vane forward faces as they engage the surface materials, said surface materials moving toward the first end cap, thereby incorporating additional inertia or thrust to reduce the drag coefficient rather than simply building up in front of, underneath of, or behind the wave form vanes. Eliminating this buildup of materials permits the vehicles equipped with roller assemblies having wave form vanes to traverse loose soils and like surfaces with far less effort expended by the person utilizing the device. The result of Applicant's incorporation of wave form vanes onto the roller assembly is a more efficient device requiring less energy to push or pull. Obviously, when pulling rather than pushing the instant invention, it will be the wave form vane rearward face which engages the surface materials, said surface materials being directed toward the second end cap instead of the first end cap.

Finally, the foldability of the foldable frame (1) may be better understood with reference to FIG. 39, wherein the device is disclosed in its folded (at rest) position and FIGS. 2, 3, 24 and 34. The container (245) has been removed from the second payload carrier (170). The first payload carrier second frame member engagement means first insertion rod (165) and the first payload carrier second frame member engagement means second insertion rod (166) have been pulled free from the second frame member first ferrule (161) and the second frame member second ferrule (162), respectively. The second payload carrier (170) has been pulled upward, freeing the first wedging means (200) from between the second payload carrier third rod member (177) and the third payload carrier first connecting rod (227) and the second wedging means (201) from between the second payload carrier third rod member (177) and the third payload carrier second connecting rod (230). The second frame member (3) has been grasped by the second frame member first cross member (24) and pivoted upwardly such that the second frame member first cross member (24) is directly adjacent to the first frame member first cross member (8), thus preparing the foldable frame (1) for transport or storage. It is this pivoting upwardly of the second frame member first cross member (24) relative to the first frame member first cross member (8) that Applicant refers to as the rotational scissors fold, the rotational scissors fold bringing the second frame member (3) around approximately 180 degrees and allowing the foldable frame to be folded into a nearly flattened configuration.

It will be readily grasped by those skilled in the relevant arts that the frame, the wear bearing, and the wave form vane described above will have many additional uses than those set forth herein. The descriptions provided in the best mode disclosure should be understood to be merely one among the many possible uses.

The frame, as described above, could clearly be used with many sorts of friction reduction means and roller assemblies or wheels. So too, the wear bearing described above could quicky and easily be adapted for use in many other mechanical devices which require a friction reduction means capable of operation in hostile environments. Furthermore, the wave form vane could be easily adapted to function on many other roller assemblies and wheels, and would not require either the wear bearing or Applicant's frame in order to function properly.

It is impossible to forecast in advance the many possible uses to which Applicant's frame, wear bearing and wave form vane, as set forth in the claims which follow, might eventually be put and it should therefore be very clearly understood that the disclosure provided in the description set out above is merely a very detailed example of one particular use for Applicant's invention and should not be interpreted to limit Applicant's claims to solely that description.

I claim:
1. A foldable hand cart comprising;
A. a foldable frame
  I. the foldable frame having a first frame member and a second frame member,
    a. the first frame member having a first arched side, a first cross member, a second arched side, and a second cross member,
    b. the second frame member being pivotably and rotatably connected to the first frame member,
    c. the second frame member having second frame member receiving means,
  II. the foldable frame having a first payload carrier,
    a. the first payload carrier having rotatable attachment means,
      i. the rotatable attachment means being rotatably attached to the first frame member,
    b. the first payload carrier having a second frame member engagement means,
      i. the second frame member engagement means being removably inserted into the second frame member receiving means,
  III. a second payload carrier,
    a. the second payload carrier having pivotable attachment means,
      i. the pivotable attachment means being pivotably attached to the first frame member,
  IV. frame stabilizing means,
    a. the frame stabilizing means connecting the first frame member to the second frame member,
B. a first wheel riser,
  I. the first wheel riser being attached to and depending downwardly from the first frame member second cross member,
  II. the first wheel riser having first wheel mounting block attachment means,
C. a second wheel riser,
  I. the second wheel riser being attached to and depending downwardly from the first frame member second cross member,
  II. the second wheel riser having second wheel mounting block attachment means,
D. a first wheel mounting block,
  I. the first wheel mounting block having a first hollow tubular passage,
    a. the first hollow tubular passage having an axis, and diameter,
  II. the first wheel mounting block having a second hollow tubular passage,
    a. the second hollow tubular passage having an axis and diameter,
  III. the first wheel mounting block having a first hole,
    a. the first hole having a first bore extending into the first wheel mounting block,
      i. the first bore having a floor, diameter, a roughened surface texture, and depth,
    b. the first hole having diameter,
      i. the diameter being equal to the first hole first bore diameter,
    c. the first hole having an axis,
      i. the axis being perpendicular to the first wheel mounting block second hollow tubular passage axis,
  IV. the first wheel mounting block having a first ejectment means,
    a. the first ejectment means having first surface hole,
    b. the first ejectment means having a hollow tubular passage,
      i. the hollow tubular passage passing through the first wheel mounting block, coaxially with the first ejectment means first surface hole,
    c. the first ejectment means having a first bore hole,
      i. the first bore hole passing through and opening into the first bore
      ii. the first bore hole being coaxial with the third hollow tubular passage and the first surface hole,
E. a second wheel mounting block,
  I. the second wheel mounting block having a first hollow tubular passage,
    a. the first hollow tubular passage having an axis, and diameter,
  II. the second wheel mounting block having a second hollow tubular passage,
    a. the second hollow tubular passage having an axis, and diameter,
  III. the second wheel mounting block having a first hole,
    a. the first hole having a first bore extending into the first wheel mounting block,
      i. the first bore having a floor, diameter, a roughened surface texture, and depth,
    b. the first hole having diameter,
      i. the diameter being equal to the first hole first bore diameter,
    c. the first hole having an axis,
      i. the axis being perpendicular to the second wheel mounting block second hollow tubular passage axis,
  IV. the second wheel mounting block having a first ejectment means,
    a. the first ejectment means having a first surface hole,
    b. the first ejectment means having a hollow tubular passage,
      i. the hollow tubular passage passing through the second wheel mounting block, coaxially with the second wheel mounting block first ejectment means first surface hole,
    c. first ejectment means having a first bore hole,
      i. the first bore hole passing through and opening into the first bore, ii. the first bore hole being coaxial with the third hollow tubular passage and the first surface hole,
F. a first attachment means,
  I. the first attachment means passing through the first wheel mounting block first hollow tubular passage and engaging the first wheel riser first wheel mounting block attachment means,
G. a second attachment means,
  I. the second attachment means passing through the first wheel block second hollow tubular passage and engaging the first wheel riser first wheel mounting block attachment means,
H. a third attachment means,
  I. the third attachment means passing through the second wheel block first hollow tubular passage and engaging the second wheel riser second wheel mounting block attachment means,
I. a fourth attachment means,
  I. the fourth attachment means passing through the second wheel block second hollow tubular passage and engaging the second wheel riser second wheel mounting block attachment means,
J. friction reduction means,
  I. the friction reduction means being press fit within the first wheel mounting block first bore and the second wheel mounting block first bore,
K. a roller assembly,
  I. the roller assembly having a first end cap,
    a. the first end cap having outer diameter and radius,
      i. the radius being equal to one half of the outer diameter,
    b. the first end cap having a stub axle,
      i. the stub axle having outer diameter and depth,
      ii. the stub axle being co-axial with the first end cap,
      iii. the stub axle being inserted within the friction reduction means located in the first wheel mounting block,
    c. the first end cap outer diameter being greater than the first end cap stub axle outer diameter,
  II. the roller assembly having a second end cap
    a. the second end cap having outer diameter,
      i. the outer diameter being equal to the first end cap outer diameter,
    b. the second end cap having radius,
      i. the radius being equal to one half of the second end cap outer diameter,
    c. the second end cap having a stub axle,
      i. the stub axle having outer diameter,
        aa. the outer diameter being equal to the first end cap stub axle outer diameter,
      ii. the stub axle having depth,
        aa. the depth being equal to the first end cap stub axle depth,
      iii. the stub axle being co-axial with the second end cap,
      iv. the stub axle being inserted within the friction reduction means located in the second wheel mounting block,
    d. the second end cap outer diameter being greater than the second end cap stub axle outer diameter,
  III. the roller assembly having a cylindrical roller section,
    a. the cylindrical roller section having a first end and a second end,
      i. the first end being attached to the first end cap,
      ii. the second end being attached to the second end cap,
    b. the cylindrical roller section having outer diameter of less than the first end cap outer diameter,
    c. the cylindrical roller section having a longitudinal axis,
      i. the longitudinal axis having a mid-point along it,
        aa. the mid-point being equidistant from the first end cap and the second end cap,
    d. the cylindrical roller section being coaxial with the first end cap and the second end cap,
    e. the cylindrical roller section having a continuous exterior surface,
  IV. the roller assembly having a plurality of wave form vanes,
    a. the wave form vanes being attached to the cylindrical roller section,
    b. the wave form vanes extending from proximate to the cylindrical roller section first end, though not in contact with the first end cap, to proximate to the cylindrical roller section second end, though not in contact with the second end cap,
    c. the wave form vanes being positioned on the exterior surface, radially about the longitudinal axis,
    d. the wave form vanes each having a midsection, a second section and a third section,
      i. the mid-section being at an acute angle relative to the cylindrical roller assembly longitudinal axis,
        aa. the mid-section having a forward face and a rearward face, the forward face and the rearward face being parallel to one another,
      ii. the second section being at an obtuse angle relative to the mid-section,
        aa. the second section having a forward face and a rearward face, the forward face and the rearward face being parallel to one another,
      iii. the third section being at an obtuse angle relative to the mid-section and at an opposite angle relative to the second section,
        aa. the third section having a forward face and a rearward face, the forward face and the rearward face being parallel to one another,
    e. the wave form vanes each having height,
      i. wave form vane height and cylindrical roller section radius together being less than the second end cap radius.

2. The foldable hand cart according to claim 1, the friction reduction means further comprising;
A. a wear bearing,
  I. the wear bearing having an inner sleeve,
    a. the inner sleeve having outer diameter, inner diameter, thickness, and depth,
      i. the depth being equal to the first wheel mounting block first bore depth
    b. the wear bearing inner sleeve having an outer surface, an inner surface, and a wheel facing surface,
      i. wheel facing surface connecting the inner surface and the outer surface,
    c. the wear bearing inner sleeve having a wheel mounting block facing surface,
      i. the wheel mounting block facing surface being parallel to, though not co-planar with, the wheel facing surface,
      ii. the wheel mounting block facing surface connecting the inner surface and the outer surface,
  II. the wear bearing having an outer sleeve,
    a. the wear bearing outer sleeve having outer diameter,
      i. the outer diameter being greater than the wear bearing inner sleeve outer diameter, b. the wear bearing outer sleeve having inner diameter,
   i. the inner diameter being greater than the wear bearing inner sleeve outer diameter such that the wear bearing inner sleeve may be snugly inserted coaxially within the wear bearing outer sleeve,
      aa. the wear bearing inner sleeve being rotatable within the wear bearing outer sleeve,
c. the wear bearing outer sleeve having thickness, and depth,
   i. the depth being equal to the wear bearing inner sleeve depth,
d. the wear bearing outer sleeve having an outer surface,
   i. the outer surface havinga first hole passing therethrough,
e. the wear bearing outer sleeve having an inner surface,
   i. the inner surface having a second hole passing therethrough,
      aa. the second hole and the first hole being connected to one another by a bore, the bore passing completely through the outer sleeve, and being co-axial with the first hole and the second hole,
f. the wear bearing outer sleeve having a wheel facing surface,
   i. the wheel facing surface connecting the inner surface and the outer surface,
g. the wear bearing outer sleeve having a wheel mounting block facing surface,
   i. the wheel mounting block facing surface being parallel to, though not co-planar with, the wear bearing outer sleeve wheel facing surface,
   ii. the wheel mounting block facing surface connecting the inner surface and the outer surface,
h. the wear bearing being located in the first wheel mounting block first bore such that the wear bearing outer sleeve wheel mounting block facing surface is in contact with the first wheel mounting block first bore floor, B. a second wear bearing,
I. the second wear bearing having an inner sleeve,
   a. the inner sleeve having outer diameter, inner diameter, thickness, and depth,
      i. the depth being equal to the first wheel mounting block first bore depth,
   b. the second wear bearing inner sleeve having an outer surface, an inner surface, and a wheel facing surface,
      i. the wheel facing surface connecting the inner surface and the outer surface,
   c. the second wear bearing inner sleeve having a wheel mounting block facing surface,
      i. the wheel mounting block facing surface being parallel to, though not co-planar with, the wheel facing surface,
      ii. the wheel mounting block facing surface connecting the inner surface and the outer surface,
II. the second wear bearing having an outer sleeve,
   a. the outer sleeve having outer diameter,
      i. the outer diameter being greater than the second wear bearing inner sleeve outer diameter,
   b. the second wear bearing outer sleeve having inner diameter,
      i. the inner diameter being greater than the second wear bearing inner sleeve outer diameter such that the second wear bearing inner sleeve may be snugly inserted coaxially within the second wear bearing outer sleeve,
         aa. the second wear bearing inner sleeve being rotatable within the second wear bearing outer sleeve,
   c. the second wear bearing outer sleeve having thickness, and depth,
      i. the depth being equal to the wear bearing inner sleeve depth,
   d. the second wear bearing outer sleeve having an outer surface,
      i. the outer surface having a first hole passing therethrough,
   e. the second wear bearing outer sleeve having an inner surface,
      i. the inner surface having a second hole passing therethrough,
         aa. the second hole and the first hole being connected to one another by a bore, the bore passing completely through the outer sleeve, and being co-axial with the first hole and the second hole,
   f. the second wear bearing outer sleeve having a wheel facing surface,
      i. the wheel facing surface connecting the inner surface and the outer surface,
   g. the second wear bearing outer sleeve having a wheel mounting block facing surface,
      i. the wheel mounting block facing surface being parallel to, though not co-planar with, the wheel facing surface,
      ii. the wheel mounting block facing surface connecting the inner surface and the outer surface,
   h. the second wear bearing outer sleeve being located within the second wheel mounting block first bore such that the wheel mounting block facing surface is in contact with the second wheel mounting block first bore floor.

3. The foldable hand cart according to claim 2, the roller assembly further comprising,
A. the first end cap stub axle being inserted within the wear bearing inner sleeve such that the inner sleeve inner surface is in direct contact with the stub axle and such that the stub axle and the inner sleeve are coaxial with one another,
B. the second end cap stub axle being inserted within the second wear bearing inner sleeve such that the inner sleeve inner surface is in direct contact with the stub axle and such that the stub axle and the inner sleeve are coaxial with one another.

4. The foldable hand cart according to claim 1, the frame stabilizing means further comprising,
A. a first wedging means,
   I. the first wedging means having a first half and a second half,
      a. the first half being attached to the second payload carrier,
B. a second wedging means,
   I. the second wedging means having a first half and a second half,
      a. the first half being attached to the second payload carrier,
C. a for receiving the first weging means,
   I. the ferrule being attached to the second frame member,
   II. the ferrule being sized and shaped for the snug insertion therein of the first wedging means second half, D. a ferrule for receiving the second wedging means,
   I. the ferrule being attached to the second frame member,
   II. the ferrule being sized and shaped for the snug insertion therein of the second wedging means second half.

5. The foldable hand cart according to claim 1, the second frame member further comprising;
A. first arched side,
   I. the first arched side having an arc shaped mid-body,
B. a first cross member,
   I. the first cross member having an essentially linear shaped mid-body and being attached to the first arched side,
C. a second cross member,
   I. the second cross member having an essentially "U" shaped mid-body and being attached to the first arched side,
D. a second arched side,
   I. the second arched side having an arc shaped mid-body,
   I. the second arched side being attached to the first cross member and the second cross member.

6. The foldable hand cart according to claim 5, the frame stabilizing means further comprising,
A. a first wedging means,
   I. the first wedging means having a first half and a second half,
      a. the first half being attached to the second payload carrier,
B. a second wedging means,
   I. the second wedging means having a first half and a second half,
      a. the first half being attached to the second payload carrier,
C. a ferrule for receiving the first wedging means,
   I. the ferrule being attached to the second frame member,
   II. the ferrule being sized and shaped for the snug insertion therein of the first wedging means second half,
D. a ferrule for receiving the second wedging means,
   I. the ferrule being attached to the second frame member,
   II. the ferrule being sized and shaped for the snug insertion therein of the second wedging means second half.

7. The foldable hand cart according to claim 5 further comprising:
A. a third payload carrier,
   I. the third payload carrier being pivotably attached to the second frame member.

8. The foldable hand cart according to claim 7, the frame stabilizing means further comprising;
A. a first wedging means,
   I. the first wedging means having a first half and a second half,
      a. the first half being attached to the second payload carrier and located such that the second half may be snugly inserted between the second frame member and the third payload carrier,
B. a second wedging means,
   I. the second wedging means having a first half and a second half,
      a. the first half being attached to the second payload carrier and located such that the second half may be snugly inserted between the second frame member and the third payload carrier.

9. A foldable hand cart frame comprising;
A. a first frame member,
   I. the first frame member having arched sides,
B. a first payload carrier,
   I. the first payload carrier having rotatable attachment means,
      a. the rotatable attachment means being rotatable attached to the first frame member,
   II. the first payload carrier having engagement means,
      a. the engagement means being sized and shaped for removable insertion into a receiving means,
C. a second frame member,
   I. the second frame member being pivotably and rotatably connected to the first frame member,
   II. the second frame member having the receiving means attached thereto,
   III. the second frame member having arched sides,
D. a second payload carrier,
   I. the second payload carrier having pivotable attachment means being pivotably attached to the first frame member,
E. frame stabilizing means,
   I. the frame stabilizing means connecting the first frame member to the second frame member.

10. The foldable hand cart frame according to claim 9, the frame stabilizing means further comprising,
A. a first wedging means,
   I. the first wedging means having a first half and a second half,
      a. the first half being attached to the second second payload carrier,
B. a second wedging means,
   I. the second wedging means having a first half and a second half
      a. the first half being attached to the second payload carrier,
C. a ferrule for receiving the first wedging means,
   I. the ferrule being attached to the second frame member and being sized and shaped for the snug insertion therein of the first wedging means second half,
D. a ferrule for receiving the second wedging means,
   I. the ferrule being attached to the second frame member and being sized and shaped for the snug insertion therein of the second wedging means second half.

11. The foldable hand cart frame according to claim 9 further comprising:
A. a third payload carrier,
   I. the third payload carrier being pivotably attached to the second frame member.

12. The foldable hand cart frame according to claim 11, the frame stabilizing means further comprising;
A. a first wedging means,
   I. the first wedging means having a first half and a second half,
      a. the first half being attached to the second payload carrier and located such that the second half may be snugly inserted between the second frame member and the third payload carrier,
B. a second wedging means,
   I. the second wedging means having a first half and a second half,
      a. the first half being attached to the second payload carrier and located such that the second half may be snugly inserted between the second frame member and the third payload carrier.

13. A roller assembly comprising;
A. a first end cap
 I. the first end cap having outer diameter and radius,
 II. the first end cap having a stub axle,
  a. the stub axle having outer diameter, depth and being co-axial with the first end cap,
 III. the first end cap outer diameter being greater than the stub axle outer diameter,
B. a second end cap
 I. the second end cap having outer diameter equal to the first end cap outer diameter,
 II. the second end cap having radius,
  a. the radius being equal to one half of the second end cap outer diameter,
 III. the second end cap having a stub axle,
  a. the stub axle having outer diameter,
   i. the outer diameter being equal to the first end cap stub axle outer diameter,
  b. the stub axle having depth and being co-axial with the second end cap,
 IV. the second end cap outer diameter being greater than the second end cap stub axle outer diameter,
A. a cylindrical roller section,
 I. the cylindrical roller section having a first end and a second end,
  a. the first end being attached to the first end cap,
  b. the second end being attached to the second end cap,
 II. the cylindrical roller section having outer diameter less than the first end cap outer diameter and a longitudinal axis,
  a. the longitudinal axis having a mid-point along it,
   i. the mid-point being equidistant from the first end cap and the second end cap,
 III. the cylindrical roller section being coaxial with the first end cap and the second end cap,
 IV. the cylindrical roller section having a continuous exterior surface,
D. a plurality of wave form vanes,
 I. the wave form vanes being attached to the cylindrical roller section,
 II. the wave form vanes extending from proximate to the cylindrical roller section first end, though not in contact with the first end cap, to proximate to the cylindrical roller section second end, though not in contact with the second end cap,
 III. the wave form vanes being positioned on the cylindrical roller section radially about the cylindrical roller section longitudinal axis,
 IV. the wave form vanes each having a mid-section, a second section and a third section,
  a. the mid-section being at an acute angle relative to the cylindrical roller assembly longitudinal axis,
   i. the mid-section having a forward face and a rearward face, the forward face and the rearward face being parallel to one another,
  b. the second section being at an obtuse angle relative to the mid-section,
   i. the second section having a forward face and a rearward face, the forward face and the rearward face being parallel to one another,
  c. the third section being at an obtuse angle relative to the mid-section and at an opposite angle relative to the second section,
   i. the third section having a forward face and a rearward face, the forward face and the rearward face being parallel to one another,
 V. the wave form vanes each having height,
  A. height and cylindrical roller section radius together being less than the second end cap radius.
14. A wear bearing comprising;
A. a wear bearing inner sleeve having outer diameter, inner diameter, thickness, depth, an outer surface, an inner surface, and a wheel facing surface,
  a. the wheel facing surface connecting the inner surface and the outer surface,
 II. the wear bearing inner sleeve having a wheel mounting block facing surface,
  a. the wheel mounting block facing surface being parallel to, though not co-planar with, the wheel facing surface,
  b. the wheel mounting block facing surface connecting the inner surface and the outer surface,
B. a wear bearing outer sleeve,
 I. the wear bearing outer sleeve having outer diameter,
  a. the outer diameter being greater than the inner sleeve outer diameter,
 II. the wear bearing outer sleeve having inner diameter,
  a. the inner diameter being greater than the inner sleeve outer diameter such that the inner sleeve may be snugly inserted coaxially within the outer sleeve,
   i. the inner sleeve being rotatable within the outer sleeve,
 III. the wear bearing outer sleeve having thickness, depth, and an outer surface,
  a. the outer surface having a first hole passing therethrough,
 VI. the wear bearing outer sleeve having an inner surface,
  a. the inner surface having a second hole passing therethrough,
   i. the second hole and the first hole being connected to one another by a bore, the bore passing completely through the outer sleeve, and being co-axial with the first hole and the second hole,
 VII. the wear bearing outer sleeve having a wheel facing surface,
  a. the wheel facing surface connecting the inner surface and the outer surface,
 VII. the outer sleeve having a wheel mounting block facing surface,
  a. the wheel mounting block facing surface being parallel to, though not co-planar with, the wheel facing surface,
  b. the wheel mounting block facing surface connecting the inner surface and the outer surface.
15. The wear bearing according to claim 14, the outer sleeve further comprising;
A. the outer surface having a rough texture.
16. The wear bearing according to claim 15, the inner sleeve further comprising;
A. the inner surface having a rough texture.
17. A foldable hand cart frame comprising
A. a first frame member,
B. a second frame member,
 I. the second frame member being pivotably and rotatably connected to the first frame member,
 II. the second frame member having receiving means attached thereto for receiving engagement means,
C. a first means for temporarily connecting the first frame member to the second frame member, I. first means for temporarily connecting the first frame member to the second frame member being rotatably attached to the first frame member, II. the first means for temporarily connecting the first frame member to the second frame member having the engagement means, the engagement means being sized and shaped for removable insertion into the receiving means.

\* \* \* \* \*